(12) United States Patent
Parenteau et al.

(10) Patent No.: US 7,750,922 B2
(45) Date of Patent: Jul. 6, 2010

(54) TRANSPARENCY GROUP COMPUTATION ON A GRAPHICS PROCESSING UNIT

(75) Inventors: Alexandre S. Parenteau, San Jose, CA (US); John Charles Nash, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 607 days.

(21) Appl. No.: 11/557,749

(22) Filed: Nov. 8, 2006

(65) Prior Publication Data

US 2008/0094411 A1 Apr. 24, 2008

Related U.S. Application Data

(60) Provisional application No. 60/854,246, filed on Oct. 24, 2006.

(51) Int. Cl.
*G09G 5/02* (2006.01)
(52) U.S. Cl. .................. 345/592; 345/537; 345/545; 345/552; 345/581; 345/615; 345/619; 345/629; 382/260; 382/279
(58) Field of Classification Search .................. 345/615
See application file for complete search history.

(56) References Cited

U.S. PATENT DOCUMENTS

| | | | |
|---|---|---|---|
| 6,421,460 B1 * | 7/2002 | Hamburg | 382/162 |
| 6,937,245 B1 | 8/2005 | Van Hook et al. | |
| 7,042,467 B1 * | 5/2006 | Hamburg | 345/629 |
| 7,084,874 B2 * | 8/2006 | Kurzweil | 345/473 |
| 7,173,635 B2 | 2/2007 | Amann et al. | |
| 7,233,964 B2 | 6/2007 | Bakalash et al. | |
| 7,256,791 B2 | 8/2007 | Sullivan et al. | |
| 2005/0035976 A1 | 2/2005 | Ecob et al. | |
| 2005/0231516 A1 | 10/2005 | Zimmer | |
| 2006/0125838 A1 | 6/2006 | Harper | |
| 2006/0125839 A1 | 6/2006 | Harper | |
| 2006/0146072 A1 | 7/2006 | Bakalash et al. | |
| 2006/0170693 A1 | 8/2006 | Bethune et al. | |
| 2006/0244748 A1 | 11/2006 | Long et al. | |
| 2006/0268000 A1 * | 11/2006 | Long | 345/592 |

OTHER PUBLICATIONS

"What is a pixel?," Blinn, J.F. Computer Graphics and Applications, IEEE On pp. 82-87, vol. 25, Issue: 5, Sep.-Oct. 2005. Accessed via IEEE (http://ieeexplore.ieee.org/stamp/stamp.jsp?tp=&arnumber=310740&isnumber=7531) on Sep. 15, 2009.*

* cited by examiner

*Primary Examiner*—Antonio A Caschera
(74) *Attorney, Agent, or Firm*—Robert C Kowert; Meyertons, Hood, Kivlin, Kowert & Goetzel, P.C.

(57) ABSTRACT

A new transparency group may be rendered and blended with other, previously rendered, transparency groups, by using the Porter-Duff algebra available on the GPU even though the transparency groups include pre-multiplied color and alpha information. Additionally, the number of copies of the back buffer (the image information for the previously rendered transparency groups) required to properly render, blend and combine the new transparency group into the image information of previously rendered transparency groups may be minimized.

23 Claims, 11 Drawing Sheets

TRANSPARENCY GROUP COMPUTATION ON A GRAPHICS PROCESSING UNIT

This application claims priority to U.S. Provisional Patent Application No. 60/854,246, titled "Transparency Group Computation on a GPU using Porter-Duff and Pre-multiplied Alpha", filed on Oct. 24, 2006, whose inventors are Alexandre S. Parenteau and John C. Nash, and which is herein incorporated by reference in its entirety.

BACKGROUND

1. Field of the Invention

The present invention is directed to computer systems. More particularly, it is directed to graphical image processing.

2. Description of the Related Art

Traditionally, rendering a complex image, such as one requiring the rendering of multiple sub-images, on a graphic processing unit (GPU) required switching between multiple frame buffers. Additionally, texture maps have generally been used to store textures that are two-dimensional representations of three-dimensional models to be applied to various surfaces when rendering a three-dimensional scene. For example, a texture atlas may include all of the individual graphic elements rendered in a flat two-dimensional fashion that would then be applied to a three-dimensional geometry.

When utilizing graphics hardware, such as a GPU, graphics or pixels, sometimes called fragments, can generally only be rendered to individual frame buffers. Additionally, combining particular foreground graphics with the background, such as when rendering a partially transparent graphic object, traditionally involves rendering the background image to one frame buffer, allocating a second frame buffer, performing a context switch to the second frame buffer, rendering the foreground image to the second frame buffer, performing another context switch back to the original frame buffer, and then copying (and possibly blending or combining) the foreground image onto the background image in the original frame buffer to result in the correct overall image.

Furthermore, performing a context switch on a GPU is typically a very expensive, such as in terms of execution time, operation. Given that many graphic-intensive applications may include many (even thousands of) individual graphic objects requiring rendering, performing multiple context switches to render a single overall may cause significant performance issues, such as increasing the overall execution time.

When rendering complex images some systems or applications may include the use of transparency groups. A transparency group may be considered a collection of individual images to be combined together into a resultant image that may then be treated as a single object for subsequent compositing operations. Each transparency group may be associated with a opacity (or transparency) value and may also specify particular blending operations or formulas for combining the transparency group with other background images. For example, the Portable Document Format (PDF) by Adobe Systems Incorporated describes various blend modes for combining foreground and background image, such as when compositing a transparency group onto a backdrop. Additionally, some color and image formats may store color and transparency values in different manners. Thus, the compositing and/or combining of transparency groups and/or other images may involve various complicated formulas and techniques. Furthermore, the increasing number of types of specialized graphics processors may add to the complications involved in compositing images in modern graphics applications.

SUMMARY

Transparency groups or other images may be generated or rendered on graphics hardware using only a single frame buffer and without the need to switch contexts to another frame buffer, which can be extremely slow and expensive (in terms of execution time). In some embodiments, special use of a texture map or texture atlas may allow complex image rendering, including the transparency-based blending of multiple smaller images, using a single frame buffer and without performing a context switch. For example, a single frame buffer may be allocated and the overall background image may be rendered to the frame buffer. In order to render a foreground image to be combined with the background image, in some embodiments, a working section of the background image is copied from the frame buffer to a texture atlas. The working section of the frame buffer may then be cleared and the foreground image may then be rendered to that working section of the frame buffer (rather than to a separate frame buffer). The foreground image may then be copied from the frame buffer into the texture atlas at a location different from the location to which the working section of the background image was copied. The working section of the frame buffer may again be cleared. Finally, both the section of the background image and the copy of the foreground image may be copied from the texture atlas and combined (using a suitable blending algorithm) into the working section of the frame buffer.

Furthermore, a new transparency group may be rendered and blended with other, previously rendered, transparency groups, by using the Porter-Duff algebra available on the GPU even though the transparency groups include pre-multiplied color and alpha information. Additionally, the number of copies of the back buffer (the image information for the previously rendered transparency groups) required to properly render, blend and combine the new transparency group into the image information of previously rendered transparency groups may be minimized, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
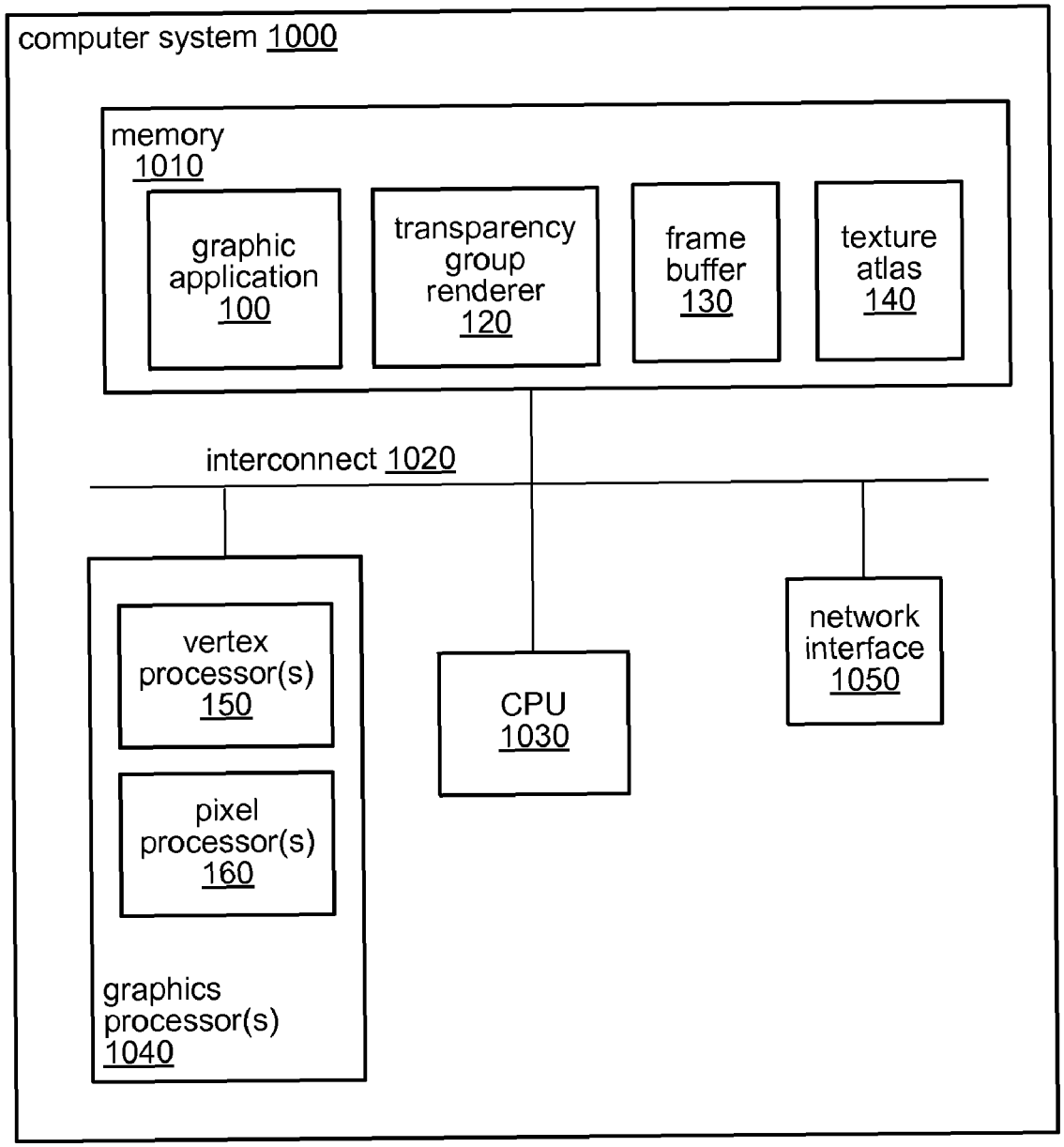
FIG. 1 is a block diagram illustrating one embodiment of a computer system capable of implementing a transparency group renderer, as described herein.

Groups of graphic objects, such as transparency groups, or other images may be generated or rendered on graphics hardware, such as on a GPU, using only a single frame buffer and without the need to switch contexts to another frame buffer, which can be extremely slow and expensive (in terms of execution time). As will be described herein, special use of a texture atlas may allow complex image rendering, including the transparency-based blending of multiple smaller images, using a single frame buffer and without performing a context switch. FIG. 1 is a block diagram illustrating one embodiments of a computer system 1000 suitable for implementing the rendering of transparency groups on a GPU 1040 using a single frame buffer 130.

A graphics processing unit or GPU is a dedicated graphics rendering device for a personal computer, workstation or game console. Modern GPUs may be very efficient at manipulating and displaying computer graphics and their highly parallel structure may make them more effective than typical CPUs for a range of complex graphical algorithms. For example, a GPU may implement a number of graphics primitive operations in a way that makes executing them much faster than drawing directly to the screen with the host central processing unit (CPU). Many GPUs have programmable shading as part of their capabilities. For example, each pixel can be processed by a short program that could include additional image textures as inputs, and each geometric vertex could likewise be processed by a short program before it was projected onto the screen. These pixel and vertex programs may be called 'shaders' and may implement looping and lengthy floating-point math, and in general are quickly becoming as flexible as CPUs and orders of magnitude faster for image-array operations. GPUs may include support for programmable shaders that can manipulate and vertices and textures with many of the same operations supported by CPUs, oversampling and interpolation techniques to reduce aliasing, and very high-precision color spaces.

Frequently there are multiple overlapping image elements to be rendered and combined with the background for a final image. These groups of overlapping image elements may be called transparency groups. A transparency group may be considered a set of images collected together. Each object of a transparency group may have associated levels of opacity or transparency directing how the individual images relate to each other when rendered. In some embodiments, various individual elements of a transparency group may be combined using different compositing effects, such as to result in different levels of transparency or opacity. The result may then be treated as if it were a single object for subsequent compositing operations. The objects within a transparency group may be composited against some initial backdrop producing a composite color, shape and opacity for the group as a whole. The result is an object whose shape is the union of all the shapes of the objects in the transparency group and whose color and opacity are the result of the compositing operations. Additionally, the overall rendering of the transparency group may then be combined with background image, such as by using another level of transparency to result in the final, overall image. For example, the Portable Document Format (PDF) by Adobe Systems Incorporated describes a transparency group as a sequence of consecutive objects in a transparency stack that are collected together and composited to produce a single color, shape, and opacity at each point. The Portable Document Format is an open file format for representing two-dimensional documents in a device independent and resolution independent format.

An object's shape may determine the degree to which the composite color replaces the backdrop color. In some embodiments, shape values of 0.0 and 1.0 may identify points that lie outside and inside a conventional sharp-edged object. Intermediate values may be useful for defining soft-edges objects, according to one embodiment. Shape and opacity may be considered very similar. In some embodiments, shape and opacity may be combined into a single value, called alpha, which may control both the color compositing computation and a fading between an object and its backdrop. According to some embodiments, a pixel's color information may be stored using separate red, green and blue values (e.g. R, G, B). Additionally, the pixel's alpha value may also be stored with the color values. Thus, a pixel's color and alpha values may be stored as group of four numbers—red, blue, green and alpha (r, g, b, a). In some embodiments, the color values may be multiplied by the alpha value and stored in a pre-multiplied alpha form (e.g., ra, ga, ba, a). Thus, pre-multiplied alpha may be considered a way of representing color and alpha values. Pre-multiplied alpha values are maintained and used for a variety of reasons. For example, some combinations of pixels may be easier to work with when using pre-multiplied alpha values. For instance, a 50/50 blend of white and transparent may be represented as the combination of opaque white (1,1,1,1) and transparent (0,0,0,0) regardless of whether one is using pre-multiplied alpha or not. The 50/50 blend of white and transparent may be (0.5, 0.5, 0.5, 0.5). When using pre-multiplied alpha values, (0.5, 0.5, 0.5, 0.5) represents a half-transparent white, which is what one expects. When not using pre-multiplied alpha values, this results in a half-transparent gray, which is not what one expects.

In some embodiments, there may be two types of transparency groups, isolated and non-isolated transparency groups. An isolated transparency group is one whose elements are composited onto a fully transparent backdrop rather than onto the groups backdrop. The resulting source color, object shape, and object alpha values for the group are therefore independent of the group backdrop. The only interaction with the group backdrop occurs when the group's computed color, shape, and alpha are then composited with it. In particular, the special effects produced by blend modes of objects within the group, and of the group as a whole, take into account on the intrinsic colors and opacities of those objects; they are not influenced by the group's backdrop. Any blending modes or special effects applied to the objects in an isolated transparency group only affect the object in the group and not any background or backdrop image behind the group. When an object is composited with its backdrop, the color at each point is computed using a specified blend mode, which may be a function of both the object's color and the backdrop color. The blend mode determines how colors interact. Different blend modes may be used to achieve a variety of useful effects and different blend modes may be applied or associated with different objects and transparency groups. For example, applying a "multiply" blend mode to an object in the group produces a darkening effect on the other objects lower in the group's stack but not on the group's backdrop. In some embodiments, a blend mode that uses only Porter-Duff style bending may be considered a normal blend mode. In effect, if the source image is fully opaque (e.g. an alpha value of 1), a normal blend mode may result in the source color replacing the background color. In contrast, a non-normal blend mode may be a blend mode that uses another functions for compositing or combining the source color with the destination or backdrop color. For example, blending across color channels (e.g. blending the R, G and B channels differently from each other) or combining or mixing the color channels might be a non-normal blend mode. Thus, non-normal blend modes may be considered special effects. Individual objects within a transparency group and transparency groups themselves may be associated with particular blend modes, according to some embodiments.

Thus, an isolated transparency group may be initially rendered onto a blank background so that no color information from the background will get blended with color information for the objects of the transparency group during the rendering. The final image resulting from the rendering of the objects of the isolated transparency group may then be composited and combined with a background image. This is different from whether the transparency group has a group-level transparency value. An isolated group may have various blending modes or special effects applied to the objects of the group and then be composited onto a background using the group's transparency value. Thus, a group isolated state refers to whether any blend modes or special effects involve the color information from the group's background (or backdrop) and does not effect whether the group may have a transparency value applied to the group as a whole when it is composited with other images.

Non-isolated transparency groups, in contrast to isolated transparency groups may involve blending that includes color information from the background, such as from other previously rendered images or transparency groups.

When a complex graphic image is rendered, frequently various compositing effects, such as differing levels of transparency are used to combine various elements of the image. Generally, such compositing effects cannot be applied until after the individual elements or constituent images are rendered properly. For example, when generating a complex image that includes a partially transparent sphere in front of a particular background, both the background and the sphere are rendered individually and then combined to result in a final image that includes the background showing through, and distorted by, the transparent sphere.

In some embodiments, a transparency group renderer 120 may be configured to render a graphics image, often comprising multiple transparency groups, on GPU 1040, using a single frame buffer 130. As noted above, transparency group renderer 120 may be configured to utilize one or more texture atlases, such as texture atlas 140, to enable the rendering of transparency groups without the need to perform context switching between multiple frame buffers.

By using texture atlas 140, complex rendering may be performed in graphics hardware without using multiple frame buffers. For example, rather than render the background in one frame buffer and the sphere in separate frame buffer, transparency group renderer may utilize texture atlas 140 to temporarily store individual portions or layers of a complex image during the rendering of that image. Generally images cannot be rendered directly to a texture atlas. Instead, images or image portions are copied between a frame buffer and the texture atlas. For instance, using the example above, a single frame buffer and a single texture atlas may be allocated in graphics hardware. The background image may first be rendered or rasterized to the frame buffer. Then the section (i.e. the working section) of the background image over which the transparent sphere is to be drawn may be copied into the texture atlas. The working section of the frame buffer may then be cleared to be ready to render additional image elements. The sphere may then be rendered into the working section of the frame buffer without including any portion of the background image into the image of the sphere. The rendered sphere may then be copied into the texture atlas, such as by copying the same working section of the frame buffer, which now includes the image of the sphere rather than a portion of the background image. The working section of the frame buffer may be cleared again and then the portion of the background image and the image of the sphere from the texture atlas may be combined, such as using a suitable compositing effect or blending mode, and copied to the working section of the frame buffer.

Thus, the texture atlas may be used dynamically to temporarily store individual rendered image elements, such as the background and sphere in the example above, which may then be combined or composited into the frame buffer resulting in a final image.

GPUs, such as GPU 1040 may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers are most commonly interfaced through a non-standard and often proprietary slot due to size and weight constraints. Such ports may still be considered AGP or PCI express, even if they are not physically interchangeable with their counterparts. As illustrated in FIG. 1, memory 1010 may represent any of various types and arrangements of memory, including general purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU is extremely memory intensive, an integrated solution finds itself competing for the already slow system RAM with the CPU as it has no dedicated video memory. For instance, system RAM may experience a bandwidth between 2 GB/s and 8 GB/s, while most dedicated GPUs enjoy from 15 GB/s to 30 GB/s of bandwidth.

Hybrid solutions also share memory with the system memory, but have a smaller amount of memory on-board than discrete or dedicated graphics cards to make up for the high latency of system RAM.

Figure 2:
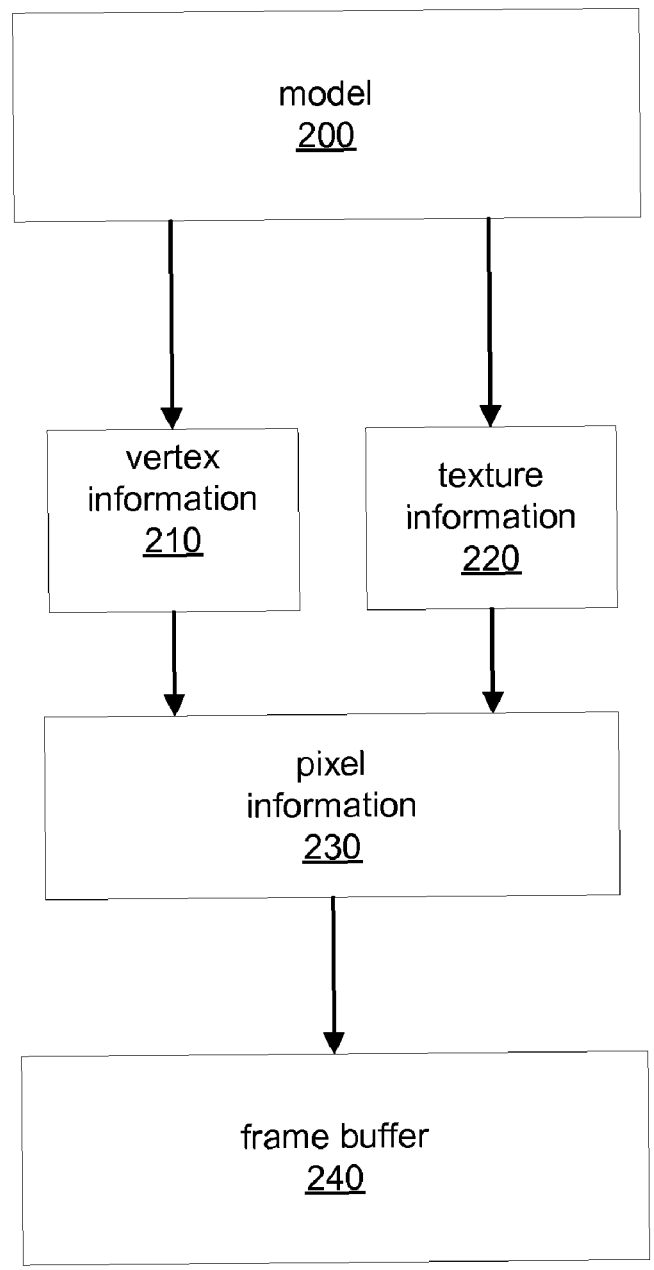
FIG. 2 is a block diagram illustrating the logical flow of rendering an image via a GPU, according to one embodiment.

A GPU may include programmable vertex and pixel and texture units. For example, FIG. 2 is a block diagram illustrating the logic flow of rendering an image via a GPU. As shown in FIG. 2, the model 200 of the graphics objects to be rendered is supplied from a graphics application executing on the CPU of a system and passes data to the vertex unit 210 and the texture unit 220. For example, graphics application 100, may call various functions of a graphics API, such as OpenGL or DirectX, that in turn instruct the various elements of the GPU to render the images. Vertex unit 210 may describe the geometry of an object while texture unit 220 may specify the skin covering on an object and pixel unit 230 may deal with the view of an object. As noted above, vertex unit 210 and pixel unit 230 may be configured to execute specific vertex and pixel programs, called shaders. For instance, vertex unit 210 may accept vertex information such as position from the model through a vertex buffer. As the same time, texture unit 220 may receive surface information from the model. Both units may complete processing and generate output pixel unit 230. Pixel unit 230 may then complete the lighting and view processing and output the rendered image to frame buffer 240 for display. A frame buffer may be a video output device that drives a video display from a memory buffer containing a complete frame of data. The information in the buffer typically consists of color values for every pixel (point that can be displayed) on the screen.

Figure 3:
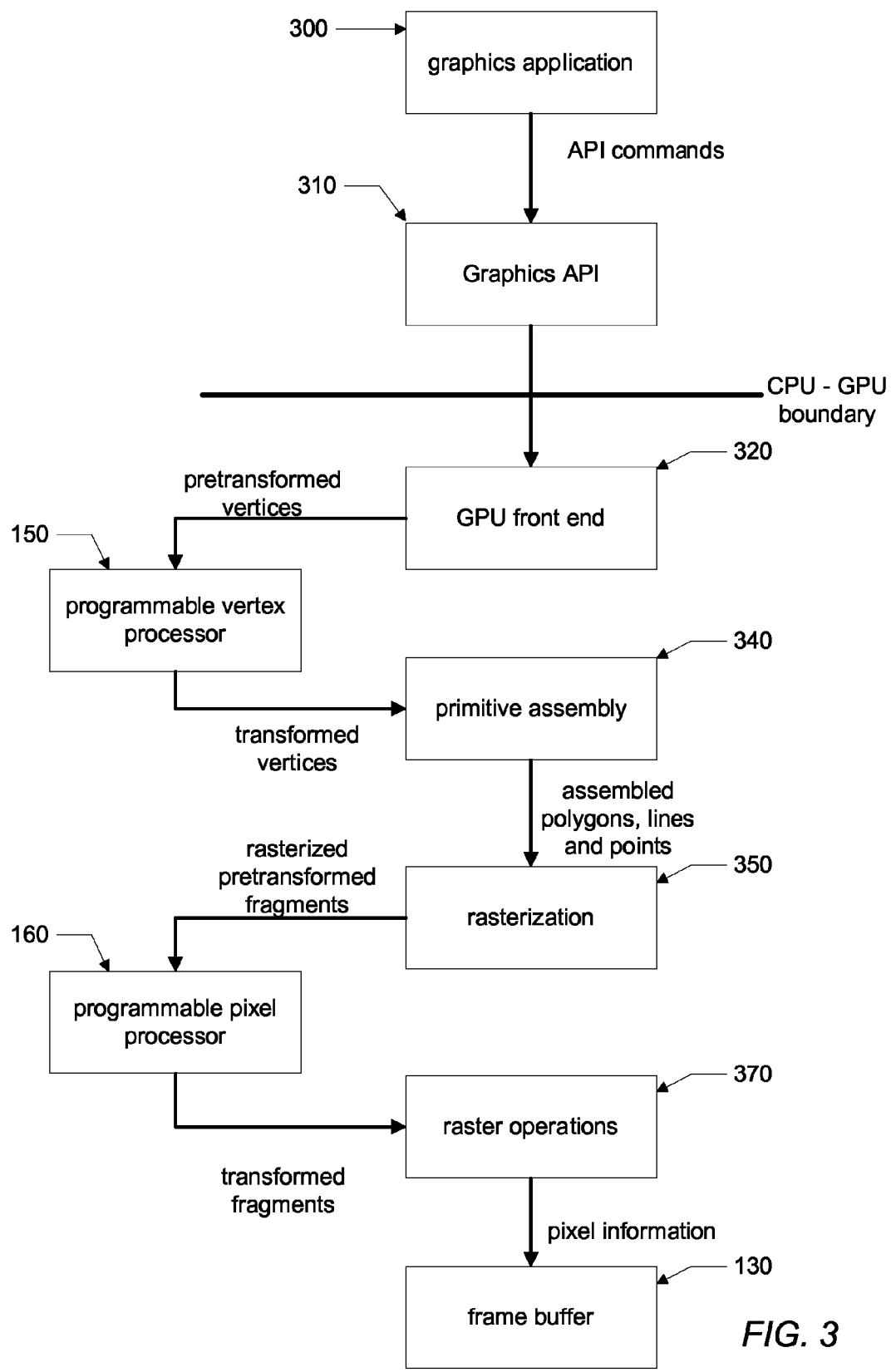
FIG. 3 is a block diagram illustrating the logical flow of functionality in a GPU pipeline, according to one embodiment.

3D graphics rendering involves numerous steps that are performed one after another. These steps can be thought of like an assembly line or pipeline. FIG. 3 is a block diagram illustrating one embodiment of the logical view of such a pipeline. A pipeline is a term used to describe the graphics card's architecture and it provides a generally accurate idea of the computing power of a graphics processor. There may be different pipelines within a graphics processor as there may be separate functions being performed at any given time. The pipeline may be broken down into two main stages: the geometry processing stage and the rendering stage. Geometry processing may involve calculations that modify or, in some cases, create new data for vertices. In the rendering stage of the pipeline, a pixel shader may be used to replace previously fixed function texturing, filtering and blending. A programmable shader, such as a pixel or vertex shader, may be considered a piece of code configured to perform different kinds of operations on GPU, including transforming and lighting (T&L), texturing, etc.

An important advantage of the modern GPU is the ability to be programmed through languages like OpenGL, DirectX or C for Graphics (CG). DirectX and OpenGL are graphics APIs or Application Programming Interfaces. Before 3D graphics APIs, each graphics card company had its own proprietary method of making their graphics card work. Developers were forced to program with vendor-specific paths for each and every type of graphics card they wished to support. This was naturally a very costly and inefficient approach. To solve this problem, 3D graphics APIs were created, so that developers could program their software to be compliant with the API and not with each independent piece of hardware. The responsibility of compatibility was then shifted to the graphics card manufacturers who had to ensure that their drivers where compatible with the API.

There emerged two different APIs, DirectX and OpenGL, both of which are used today. Initially, the APIs were relatively simple. Developers had to mix-and-match visual effects from an unchanging list of pre-programmed effects. Custom shader programming allows developers to create truly custom visual effects for the first time. Thus, graphics application 300 may call various functions supplied by graphics API 310, such as DirectX or OpenGL, in order to utilize the GPU to render a graphic image.

As noted above, vertex processor 150 and pixel processor 160 may be user programmable. A program executed by vertex processor 150 and/or pixel processor 160 may be called a 'shader'. Vertex shaders may deform or transform 3D elements.

A pixel processor, such as pixel processor 160, may be a component on the graphics chip devoted exclusively to pixel shader programs. These processing units may only perform calculations regarding pixels. Because pixels represent color values, pixel shaders may be used for all sorts of graphical effects. Pixel shaders may change pixel colors based on various types of input. For example, when the object is lit by a light source in a 3D scene in which some colors appear brighter while other colors create shadows, both the brighten objects and the shadows may be generated by changing various pixels' color information in a pixel shader. As noted above, a GPU may also include vertex processors, such as vertex processor 150, configured to execute vertex shaders that affect vertices.

A vertex shader may receive streams of vertex data from the graphics pipeline perform operations on the data and output the transformed vertex data to the graphics pipeline for further processing. For example, vertex processor 150 may receive pretransformed vertex data from GPU front end 320 and output transformed vertices to primitive assembly unit 340. Subsequently, the assembled polygons, lines and points may be sent to a rasterization unit 350. Pixel processor 160 may receive rasterized pretransformed pixel information, also called fragments, execute the applicable pixel shaders and output transformed fragments (pixel information) to a raster operations unit 370 that may then output the final pixel information to frame buffer. Raster operation processors (ROPs), such as raster operations unit 370, may be responsible for writing pixel data to memory.

A GPU may also include texture mapping units (TMUs). Textures need to be addressed and filtered. This job is frequently performed by TMUs that work in conjunction with pixel and vertex shader units. The TMU's job is to apply texture operations to pixels.

Data communicated between the graphics processing unit and the rest of the computer may travel through the graphics card slot or other interface, such as interconnect 1020 of FIG. 1.

A technique called texture mapping may be used to map a digital image onto a surface of a graphic object. The image data mapped onto the object may be called a texture, and its individual elements may be called texels. The rectangular texture resides in its own texture coordinate space, or the texture may be defined by a procedure. At each rendered pixel, selected texels may be used to substitute for or to scale one or more surface properties, such as diffuse color components. One pixel may often be mapped by a number of texels. For example, when a texture is mapped to a polygon, it is common to assign texture map coordinates directly onto the polygon's vertices. A number of different texture may be stored in a texture atlas, such as texture atlas 140, described above.

In the same manner that color can be assigned to a pixel, transparency or opacity can be assigned to it as well. Opacity and transparency are complements of each other in the sense that high opacity implies low transparency. The opacity may be considered a normalized quantity in the range [0,1], or alternatively in a discrete form in the range [0, 255] for use with 8 bit hardware. Opacity a may be related to transparency t by the expression: a=1−t. If an object has high opacity (a=1), the objects and light behind it are shielded and not visible. If at the same time the object has a non-zero color value, it is "emitting" light so it is visible. On the other hand, if a<1, the object is transparent and objects behind it are visible through it. If a=0, the object is invisible whatever the colors are. An object's (or a transparency group's) opacity in combination with the backdrop's opacity may determine the relative contributions of the backdrop color, the object's color and the blended color to the resulting composite color.

As described above, a transparency group may be considered a set of images, each of which may have associated levels of opacity or transparency directing how the individual images relate to each other when rendered. In other words, when rendering the individual images of the transparency group, each image may be combined, blended or mixed with the other images based upon each image's respective level of transparency. Additionally, the transparency group as a whole may also have an associated level of transparency indicating how the group as a whole should interact with other artwork. For example, a graphics application may be drawing a scene in which a house appears on landscape. The landscape may be the background and the graphics application may render it first, such as to a frame buffer. The application may then render, either to a separate frame buffer or after saving a copy of the background, the objects in the transparency group using each image's associated transparency level. After all the objects of the transparency group are rendered, the resultant image may then be added to, copied onto, blended with, or otherwise combined with, the background image, using the transparency group's transparency level.

Figure 4A:
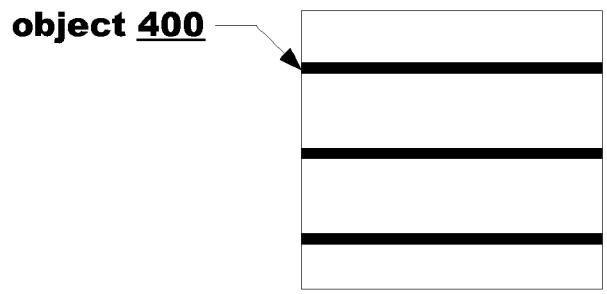
FIGS. 4A through 4C are block diagrams illustrating the rendering of a transparency group, in one embodiment.
Figure 4B:
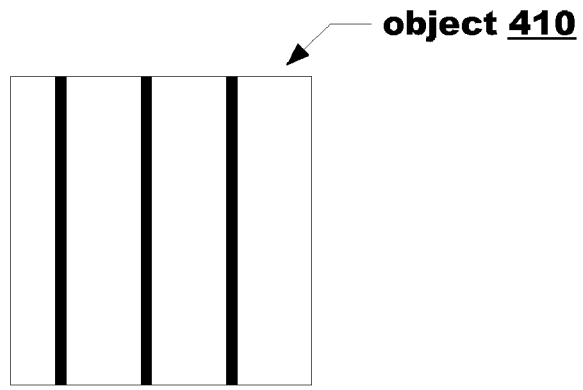
Figure 4C:
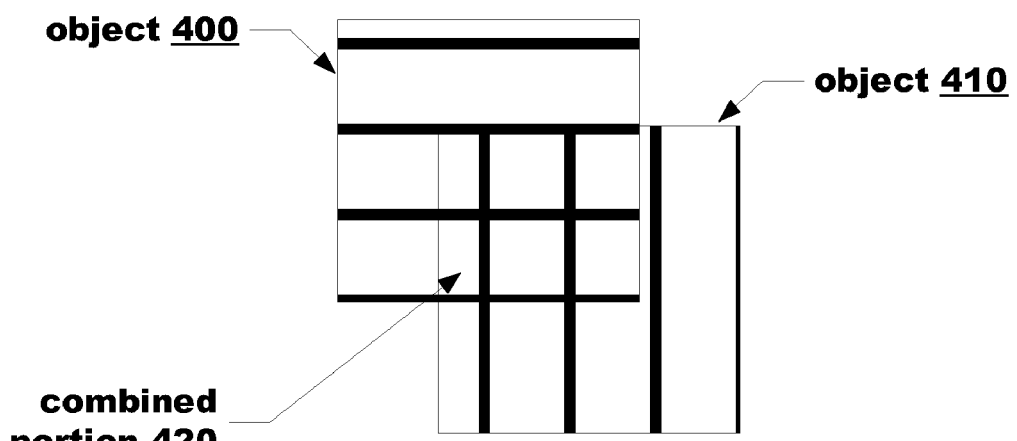

FIGS. 4A through 4C are block diagrams illustrating the rendering of a transparency group, according to one embodiment. As described above, a transparency group may include multiple graphic objects each of which may have an associated level of transparency and the group as a whole may also have an associated level of transparency. When rendering a transparency group, each of the objects may have to be combined with the other objects of the group according to the object's respective transparency level. As with other rendering, the objects of a transparency group may be rendered in back to front order. In other words objects that are farther away from the viewer may be rendered before objects that are closer to the viewer. FIG. 4A represents one object 400 of a transparency group and FIG. 4B represents another object 410 of the same transparency group. As is apparent from FIGS. 4A and 4B, each of the objects 400 and 410 have a different pattern. When rendering the entire transparency group, the individual objects 400 and 410 may be combined in various manners depending upon the individual transparency levels of the objects. For example, if object 410 has an associated transparency of 50% and if the two objects overlapped with object 410 on top, part of image 400 would be visible through object 410. Thus, as illustrated in FIG. 4C, the horizontal pattern of object 400 is visible through the vertical pattern of object 410 at combined portion 420.

FIGS. 5A through 5F are block diagrams illustrating the rending of a transparency group using a single frame buffer, according to one embodiment. As described above, transparency groups may include multiple graphic objects to be rendered resulting in an image that may be copied onto or merged with other images, such as from other transparency groups. Additionally, transparency groups may be nested such that one or more of the graphic objects of a transparency group may themselves be transparency groups consisting of multiple graphic objects. Normally, graphic scenes are rendered from back to front. In other words, the background is drawn first and then objects in the foreground are drawn, copied, or merged onto the background. Objects closer to the viewer may be drawn or rendered after objects that are further from the viewer. Transparency groups may also include partially transparent objects through which portions of other objects, such as object behind the transparent objects, should be visible. Additionally, an entire transparency group may be partially transparent so that portions of the background, or of other objects behind the transparency group, should be visible through the transparency group image.

Figure 5A:
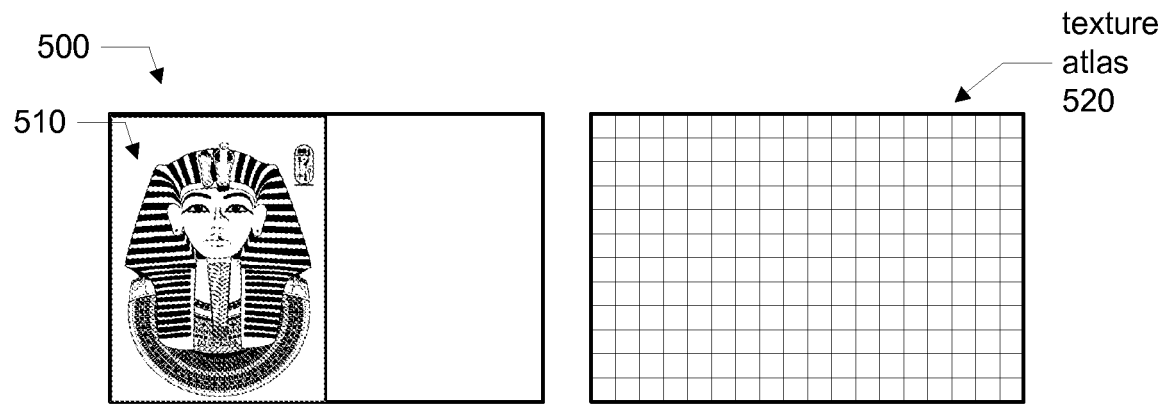
FIGS. 5A through 5F are block diagrams illustrating, according to one embodiment, the rendering of a transparency group on a GPU using a single frame buffer as described herein.
Figure 5B:
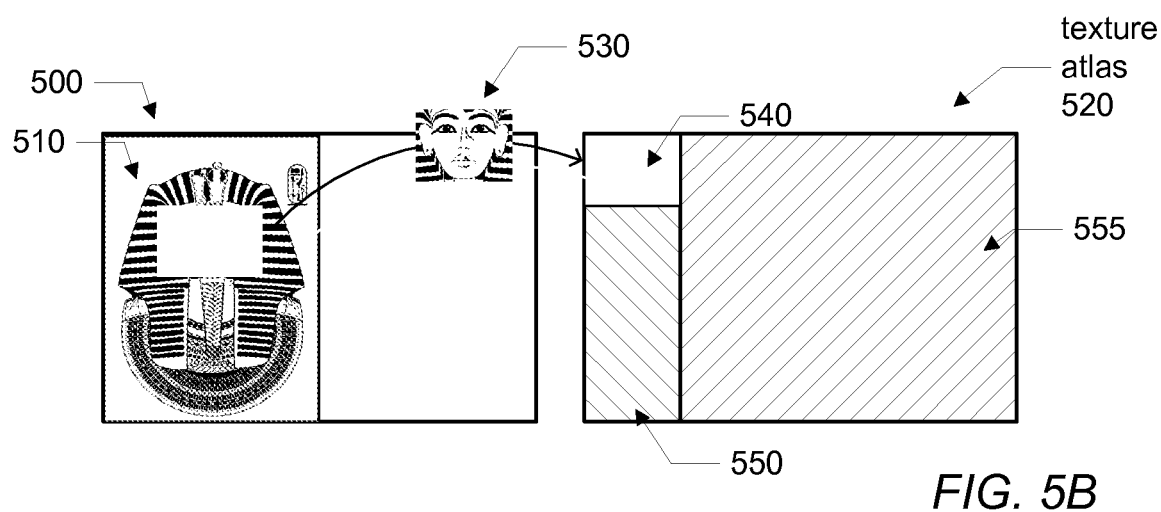
Figure 5C:
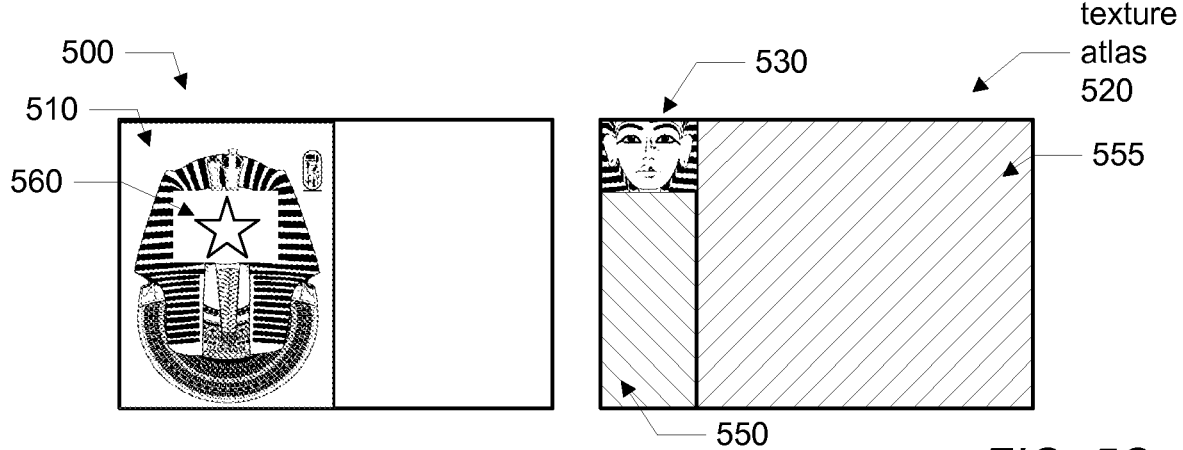
Figure 5D:
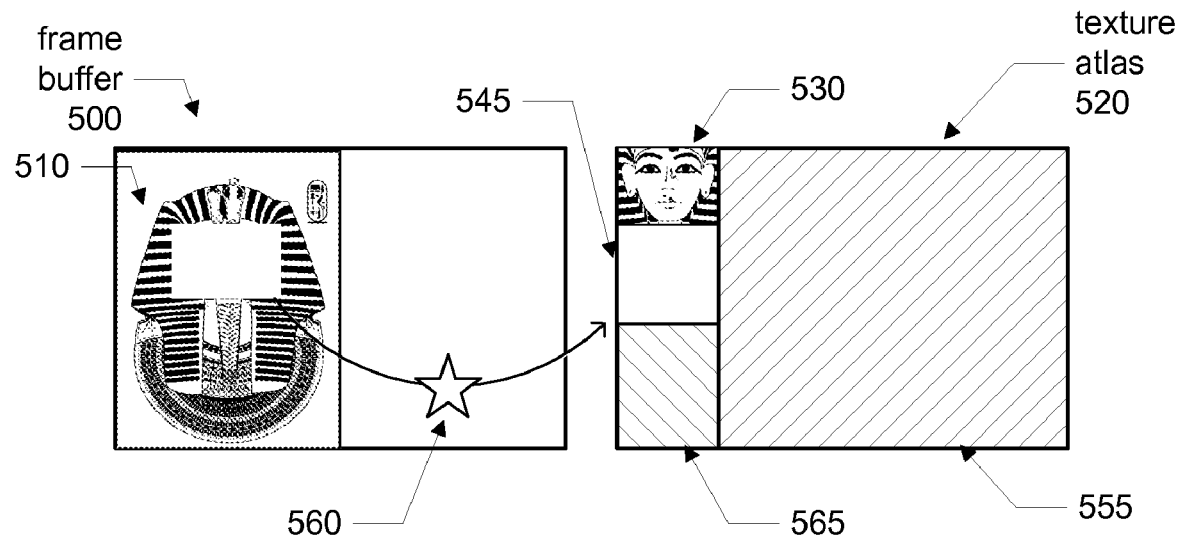
Figure 5E:
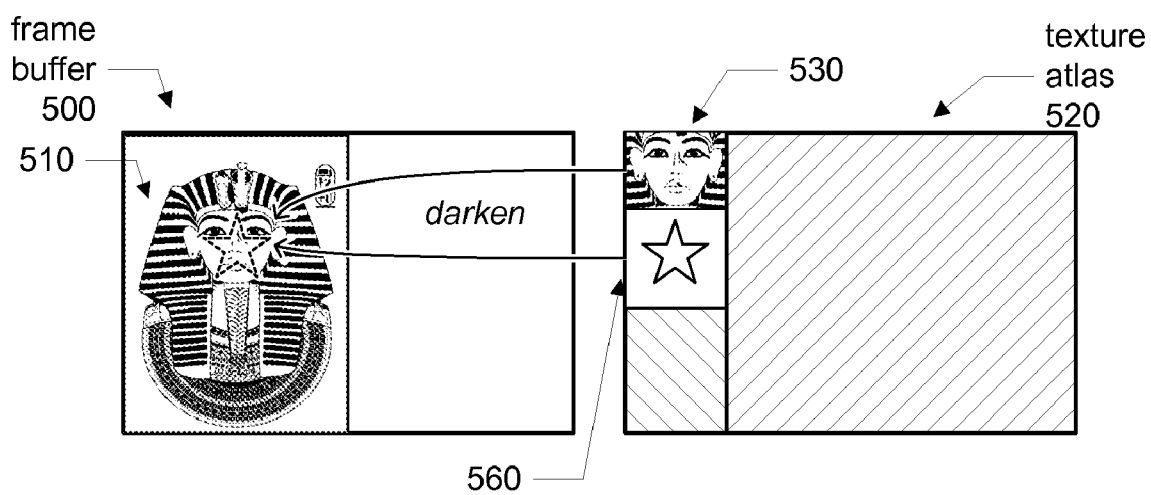
Figure 5F:
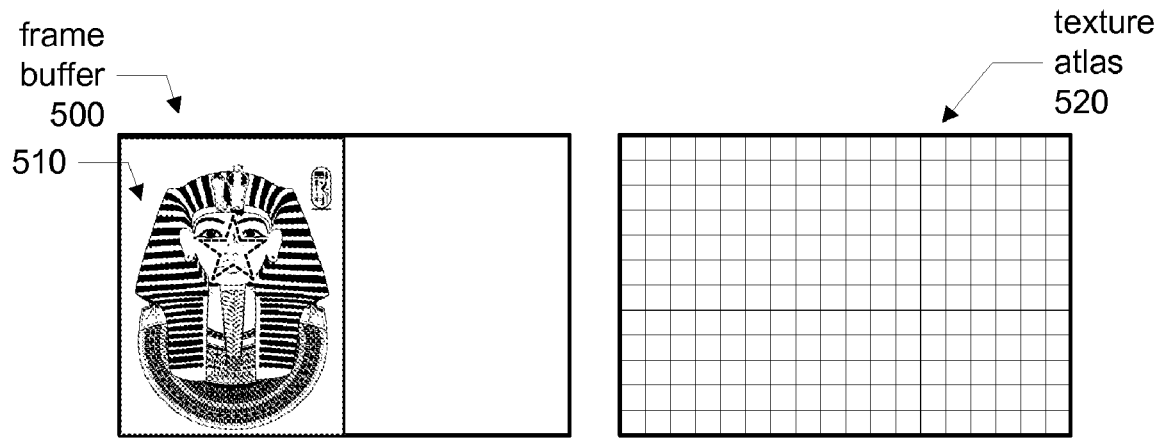

For instance, a scene may need to be drawn which a face is visible through a partially transparent star, as illustrated in FIG. 5F. Initially, as illustrated in FIG. 5A, an image 510 may be rendered to frame buffer 500. Subsequently, the star needs to be rendered. As noted above, rendering or rasterizing can only be performed to a frame buffer. As switching between different frame buffer is expensive in terms of execution time, using a single frame buffer may result in significant performance improvements over using multiple frame buffers. Thus, in some embodiments, frame buffer 500 may be used to render the star image 560. However, merely rendering the star directly onto frame buffer would necessarily overwrite or lose portions of the underlying image 510 already rendered to frame buffer 500. Thus, as illustrated in FIG. 5B, a portion of image 510, such as sub-image 530 may be copied into texture atlas 520. The size of sub-image 530 may, in some embodiments, be selected to correspond to the space needed to render image 560.

When storing images or sub-images to texture atlas 520, the location at which to store a particular image may be selected to as to minimize the amount of wasted space in the texture atlas. Thus, as illustrated in FIG. 5B, image 530 may be stored in the upper left corner of texture atlas 520, thereby maximizing the size of the remaining empty portions of texture atlas 520. By contrast, storing image 530 in the center of texture atlas 520 would limit the size of other images that might also be stored in the remaining empty portions of the texture atlas. In some embodiments, the remaining, empty portions of texture atlas 520 may be divided into separate empty blocks 550 and 555 in order to facilitate finding a suitable location in which to store a subsequent image or sub-image. In other embodiments, however, the remaining portions of texture atlas 520 may be divided horizontally rather than vertically as illustrated in FIG. 5B. In yet other embodiments, however, the remaining empty portion of texture atlas 520 may not be subdivided. In some embodiments, the remaining empty portion of texture atlas 520 may not be subdivided until another image is to be copied and a location for that image is determined within texture atlas 520.

After sub-image 530 is copied to texture atlas 520, the portion of image 510 from which sub-image 530 was copied may be cleared or emptied in preparation of rending a new image. Thus, suitable space has been cleared in frame buffer 500 to render image 560 without allocating and/or switching to another frame buffer. After image 560 is rendered in the space from which sub-image 530 was copied, as illustrated in FIG. 5C, the newly rendered image 560 may be copied into the texture atlas, as illustrated in FIG. 5D. In some embodiments, image 560 may be copied into texture atlas 520 at a location 545 within the smaller of the empty blocks remaining in texture atlas 520 after sub-image 530 was stored. For example, the currently empty portions of texture atlas 520 may be searched to determine the smallest empty portion that would hold an image to be stored. Thus, image 560 may be copied into empty block 550 of texture atlas 520 resulting in block 550 being split into location 545 into which image 560 is copied and empty block 565.

After, image 560 is copied into texture atlas 520, the portion of image 510 onto which image 560 was rendered may be cleared or erased, as illustrated in FIG. 5D. In some embodiments, sub-image 530 may not able to be copied directly back into image 510 after image 560 was rendered. Thus, as illustrated in FIG. 5E, sub-image 530 and image 560 may be merged or blended and copied into image 510. For instance image 560 may have a transparency of 50%, meaning that 50 percent of the image behind image 560 may be visible through image 560. Thus, when image 560 is combined with sub-image 530, the appropriate blending between the pixels of image 560 and sub-image 530 may be used to affect the transparency of image 560 over sub-image 530. Additionally, the combination of images 560 and 530 may then be copied into image 510 in the portion previously cleared after image 560 was copied to texture atlas 520, as illustrated in FIG. 5F.

Please note that while only two images (sub-image 530 and image 560) are illustrated being rendered and copied to texture atlas 520 in FIGS. 5A through 5F, in other embodiments, additional images may also be rendered and copied to texture atlas 520 as part of rendering a transparency group. For example, in one embodiments, image 560 may actually be a composite image of multiple sub-images, and in order to properly merge those sub-images, each individual sub-image may be rendered to the cleared space of image 510 and then stored in the texture atlas. Subsequently, the sub-images may be merged together and copied into image 560 within image 510. Then image 560 may itself be copied into texture atlas 520.

Once both sub-image 530 and image 560 are combined and copied into image 510, those portions of texture atlas 520 used to store sub-image 530 and image 560 may be made available for storing subsequent images. Additionally, the individual portions of texture atlas 520 that were created when storing sub-image 530 and image 560 may be merged. For example, block 565 may be merged with block 545 to regenerate block 550, block 550 may be merged with block 540 and with block 555 to free the entire texture atlas for use. While described above as individual blocks being merged or collapsed in the reverse order in which they were used, in some embodiments, all of the empty portions of texture atlas 520 may be merged together at one time.

In some embodiments, transparency groups may be included within other transparency groups. Such transparency groups may be considered recursive transparency groups since the rendering of the overall or outer transparency group requires the rendering of each of the smaller or inner transparency groups. Thus, when rendering the outer transparency group, the portion of the image already rendered or rasterized to the frame buffer may be copied into the texture atlas and the inner transparency group may be rendered to the frame buffer, also copied into the texture atlas and combined with the previous portion of the image and copied to the frame buffer.

Figure 6:
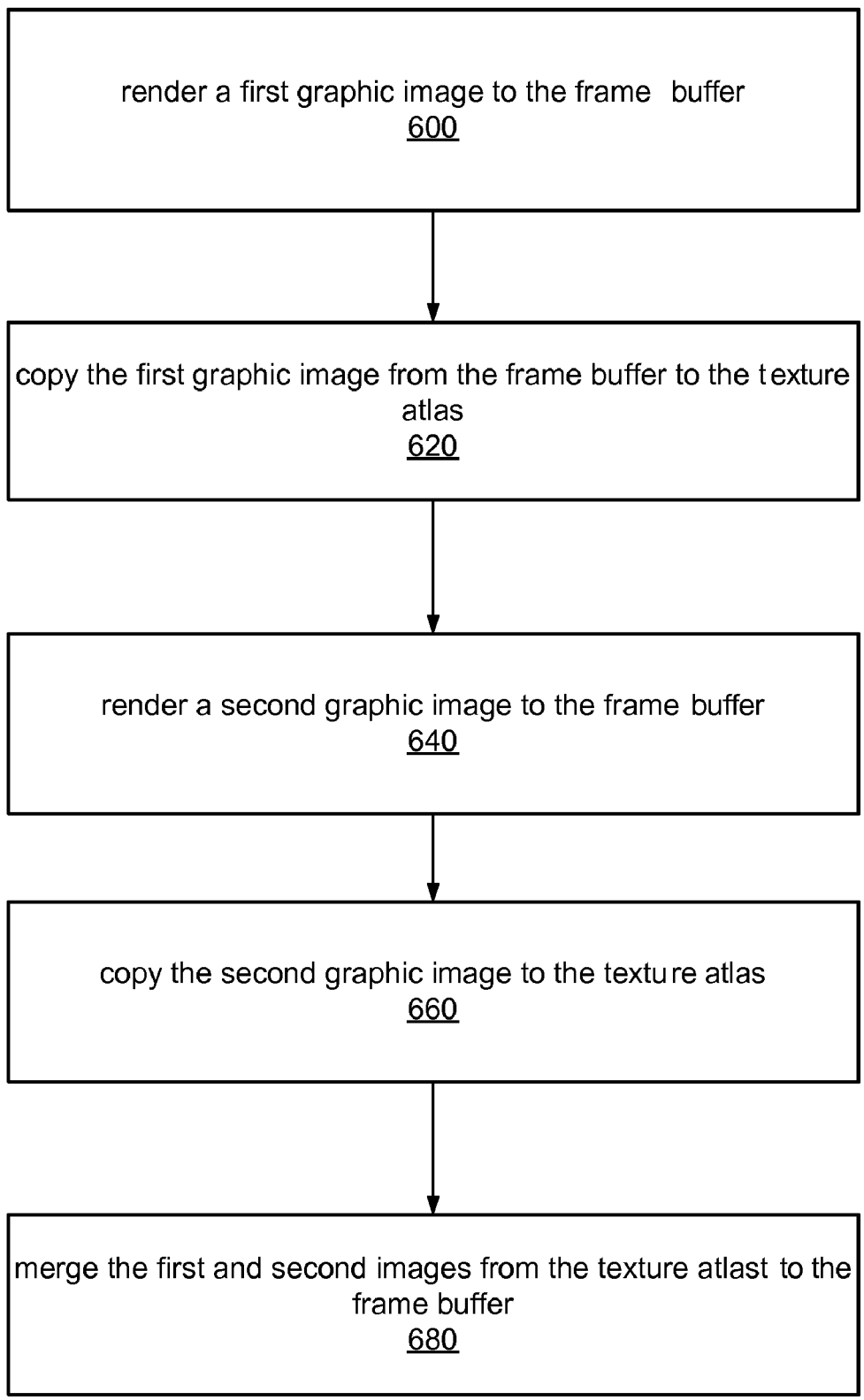
FIG. 6 is a flowchart illustrating one embodiment of a method for rendering a transparency group on a GPU using a single frame buffer as described herein.

FIG. 6 is flowchart illustrating one embodiment of a method for rendering a transparency group on a GPU using a single frame buffer. As described above, by using one or more texture atlases to temporarily store rendered images, complex scenes may be rendered using transparency groups on a GPU with only a single frame buffer, thereby obviating the need to perform potential expensive context switches between frame buffers. Thus, as described herein, a single frame buffer may be utilized to render or rasterize an image, even smaller images that will become part of a larger image and by temporarily storing images, such as sub images of a larger image in a texture atlas.

As indicated by block 600, a first graphic image is rendered to the frame buffer. For example, as described above, background image 510 may be rendered to frame buffer 500. Subsequently, when another image is to be added to or blended with image 510, a portion of image 510, such as image 530, may be copied from the frame buffer to the texture atlas, as indicated by block 620. For example, when rendering the image 560 of a star onto already rendered image 510, rather than allocate an additional frame buffer into which image 560 may be rendered or rasterized a portion of image 510, referred to as image 530, may be copied into texture atlas 520. As noted above, images may be copied into and out of a texture atlas, but may not be rendered or rasterized to the texture atlas. For instance, a texture atlas may not be the target of a graphic primitive to draw a line, such as one edge of a polygon. Instead, images or pixels may only be rasterized to a frame buffer.

Additionally, the portion of the image 510 copied to the texture atlas may represent the size needed to render the second image. After copying image 530 to the texture atlas, the portion of the image 510 occupied by the image 530 may be cleared or erased in order to ready it for rending a second image. The second image may then be rendered to the frame buffer in the cleared area, as indicated by block 640. Thus, as described above, image 560 may be rendered to the area cleared after copying image 530 to texture atlas 520. After rending the second image to the frame buffer, the second image may also be copied to the frame buffer, as indicated by block 660.

After image 560 has been rendered and stored in texture atlas 520, both image 560 and image 530 may be merged and copied back into image 510, as indicated by block 680. In some embodiments, various blending or merging effects may be used when copying the two images back into image 510. Additionally, in one embodiment the area of image 510 used to render image 560 may be cleared or erased before merging and copying images 530 and 560.

Thus, a texture atlas, normally used to store static textures, may dynamically store various images in order to use a single frame buffer to render various images while using the texture map to temporarily store images, subimages or partial images, during the rendering process.

Various methods may be used to maintain and keep track of the images in a texture atlas. Since, when processing transparency groups, various individual images may be temporarily stored to the texture atlas and subsequently copied to the frame buffer, the texture atlas may have very dynamic amounts of allocation and image usage. Additionally, the individual images may need to be individually located in the texture atlas. While in some embodiments, it may be possible to utilize a first in last out scheme for allocating image spaces in the texture atlas, in other embodiments, images may be copied from the texture atlas in a different order than an order in which they were copied to the texture atlas. In some embodiments, a linked list or other dynamic memory structure may be used to maintain and locate images that are stored in the texture atlas. For example, as illustrated in FIGS.

Figure 7A:
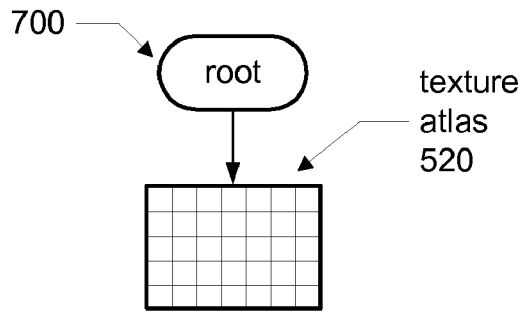
FIGS. 7A through 7G are block diagrams illustrating a tree structure to maintain information regarding images stored in a texture atlas.

7A-7G, a tree structure, such as a binary tree may be used to maintain, keep track of, and/or locate images within the texture atlas. For example, FIG. 7A illustrates the root node 700 of a structure representing an empty texture atlas 520 that has not had any images copied into it. As various methods of generating and maintaining linked lists and dynamically linked nodes are well known in the art, they will not be discussed in detail herein.

Figure 7B:
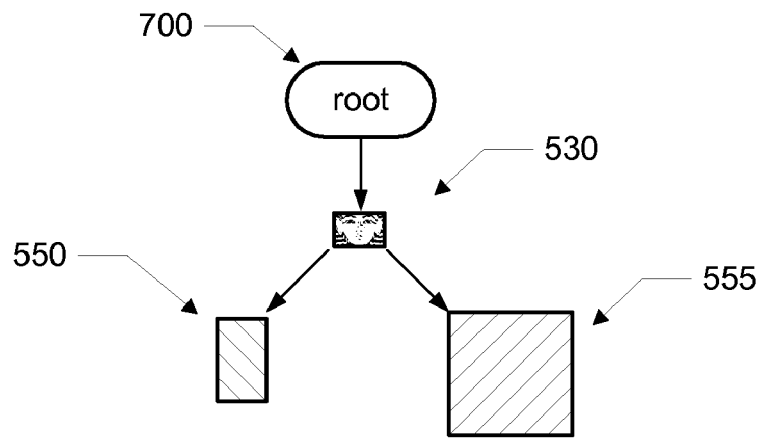
Figure 7C:
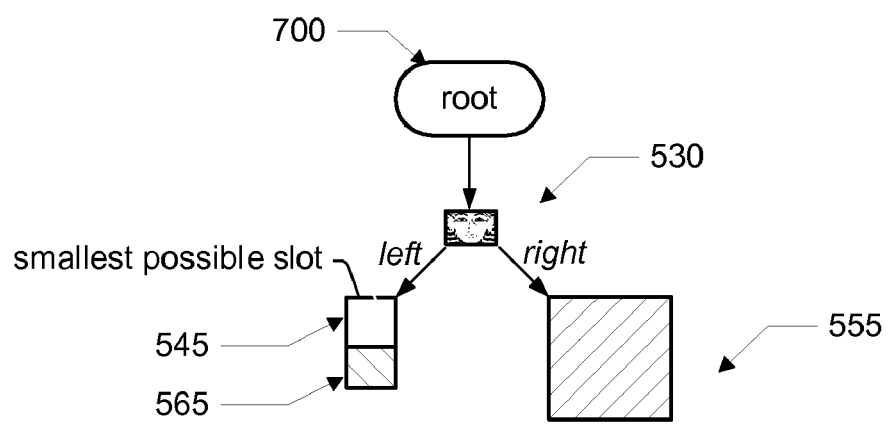

When an image, such as image 530, is to be copied into texture atlas 520, a suitable section of the texture atlas must be allocated or assigned to the image. As described above, various methods and algorithms may be used to select a suitable location within the texture atlas to store the image. In some embodiments, a method that reasonably maximizes the packing of images and/or minimized the amount of wasted space with the texture atlas may be used. After copying the image to the texture atlas, the tree structure may be updated to keep track of the image and the free areas of the texture atlas. Thus, as illustrated in FIG. 7B, a new node referencing image 530 may be allocated and added to the tree structure such that root node 700 may include a link to the new node. Please note that while FIG. 7B shows image 530 as the node the in tree structure, in many embodiments, a node of the tree structure may not be, or include, the actual image, but instead may include information identifying the image and indicating the location within texture atlas 520 where the image is stored. For instance, each node of the tree structure may be configured to hold information identifying the image stored and coordinates indicating where in the texture atlas the image is stored. Additionally, the node may store the size of the image, according to some embodiments.

Thus, FIGS. 7A through 7G illustrate the logical arrangement of the texture atlas and a tree structure used to maintain information related to the allocation of the texture atlas. Thus, FIG. 7B also illustrates two additional nodes in the tree structures each including information regarding the two empty sections of the texture atlas, sections 550 and 555, discussed above.

As illustrated in FIG. 7B, the tree structure may include two links off of each non-terminal node, according to one embodiment. Thus, the node referring to image 530 may include two links to the two empty blocks of texture atlas 520. The leaf or terminal nodes of the tree structure may always indicate either an empty block of the texture atlas or null, as will be discussed below. In some embodiments, the leaf nodes of the tree structure may be sorted by the size of the empty texture atlas blocks. For example, FIG. 7B illustrates two empty blocks of texture atlas 520 after image 530 is stored. One link may designated a left link and may reference a node indicating the smaller of the two empty texture atlas blocks, such as block 550, and another link may be designated a right link may reference a node indicating the larger of the two empty texture atlas blocks, such as block 555.

When another image, such as image 560, is to be copied into texture atlas 520, in some embodiments the smallest slot available that will hold the image to the copied may be located, according to one embodiment. As illustrated by block 7C, if image 560 fits into the smaller of the two empty texture atlas blocks, block 550, that block may be split into two blocks, blocks 545 and 565, one to hold image 560 in the texture map and one to hold the remaining empty area from block 550 after image 560 is stored. If (not illustrated) image 560 does not fit into block 550, the larger block 555 might be split into multiple blocks in order to store the image, according to another embodiments. In yet another embodiment, if image 560 does not fit into any of the empty texture atlas blocks a new texture atlas may be allocated and used to store the image. If multiple texture atlases are allocated and used, the nodes of the tree structure may include information indicating in which texture atlas a particular image is stored.

Figure 7D:
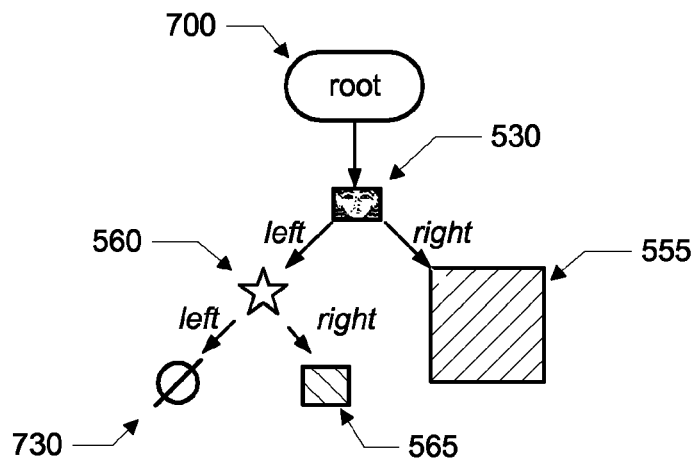
Figure 7E:
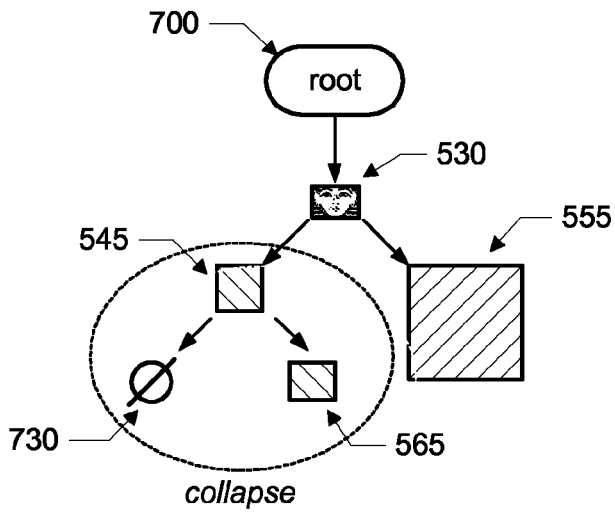

After image 560 is stored in the texture atlas a new node referencing the stored image may be added to the tree structure, as illustrated in FIG. 7D, according to one embodiment. The tree structure may now include two nodes referencing stored images (images 530 and 560), two nodes referencing empty texture atlas blocks (blocks 555 and 565) and one null node 730. If, in one embodiment, another image was to be stored in texture atlas 520, the tree structure may be traversed searching for a suitable empty block in which to store the image. In some embodiments, the individual links of the tree structure may be traversed in a left-first fashion in order look at smaller empty blocks before larger empty blocks in an attempt to locate the smallest empty block that will hold an image. Thus, in the embodiment illustrated in FIG. 7D, the tree structure may be traversed to the left until the null node 730 is encountered and then the right link of code 560 may be traverse to determine whether block 565 would hold the image. Please note that while FIGS. 7D and 7E illustrate store null nodes, such as node 730 in a left link, other embodiments may store null nodes in the right link. In other embodiments, the nodes of a structure maintaining information regarding empty blocks of the texture atlas may be traversed in other orders or manners when locating a location at which to store an image in the texture atlas. For example, in one embodiment, the tree structure may be traversed in a right first manner in order to search the larger empty blocks before the smaller empty blocks. In another embodiment, a separate set of links may be used to traverse only nodes referencing empty blocks, while avoiding nodes referencing stored images. In yet other embodiments, two linked lists, one maintaining information regarding stored image and the other maintaining information regarding empty nodes, may be used and thus the linked list maintain information regarding the empty nodes may be traversed when storing an image into the texture atlas.

In general, any suitable method or mechanism to keep track of where in the texture map particular image, image portions, or image elements, are stored may be used. In one embodiment, the locations at which images are stored within the texture atlas may be maintained in a tree structure. For example, at each node the tree structure may include an image copied to the texture atlas. Links off of each node of the tree structure may hold the remaining portions of the texture atlas. When a new image is copied to the texture atlas, a new node may be added to the tree.

Figure 7F:
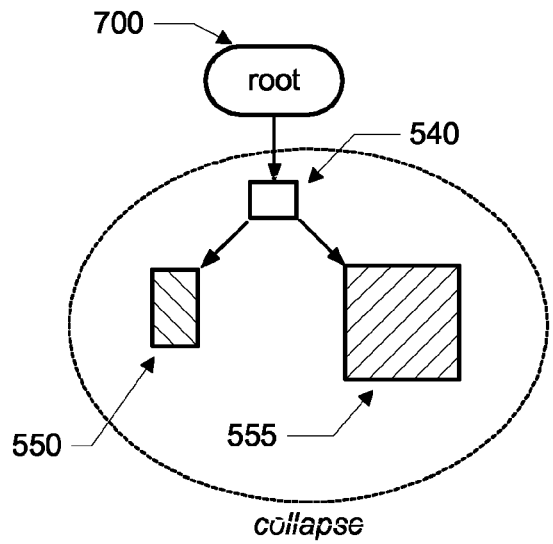
Figure 7G:
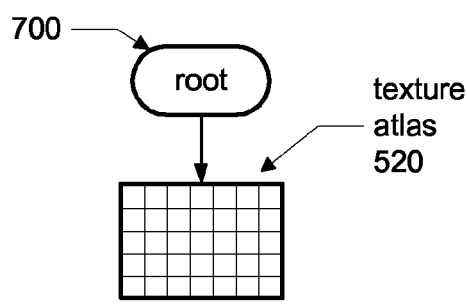

In some embodiments, the tree structure may aid the ability to combine empty portions of the texture atlas when images are removed from the texture atlas because neighboring portions of the texture atlas may reside at neighboring nodes in the tree structure. For example, as illustrated in FIGS. 7E and 7F, when image 560 is copied out of the texture atlas and it is no longer necessary to store image 560 in the texture atlas, the two adjacent empty blocks 545 and 565 may be merged back into the single empty block 550. Similarly, when it is no longer necessary to store image 530 in the texture atlas, the two adjacent empty blocks 550 and 555 may be merged—resulting in the entire empty texture atlas 520, as illustrated in FIGS. 7F and 7G.

In other embodiments, however, different methods and/or mechanisms may be utilized to keep track of the allocated and empty portions of the texture atlas. For example, the images stored in the texture atlas may be indexed using a linked list. Additionally, the empty portions of the texture atlas may also be maintained via a linked list. Thus, when an image is copied into the texture atlas, the rectangle of the texture atlas bounding the copied image may be added to the allocated linked list and the remaining rectangles left over from removing the allocated rectangle may be included in the linked list.

While improvements in terms of efficiently and/or optimally using the available space of a texture atlas may be obtained by using longer or exhaustive searches to find a better fit or the best location at which to store an image within the texture atlas, such improvements must be weighed against the increase in time required to find optimal or best fit when storing an image into the texture atlas. For example, when a graphics application is rendering a complex scene including a large number of transparency groups and or graphics objects, the overall time spent drawing the scene may be increased dramatically by exhaustively searching to find the best fit when storing images to the texture atlas. Thus, in some embodiments, a constant time algorithm may be used when determining where to store an image in the texture atlas. For example, the tree structure illustrated in FIGS. 6A-6G may be searched only for a fixed amount of time and the best location (best fit) found during that time may be used to store the image. For example, the tree structure may be searched in left first manner checking the empty texture atlas blocks in order from smallest to largest for a predetermined amount of time, but if an appropriate location is not found within that time, the search may then start checking the larger empty texture atlas blocks, such as by using the rightward link off of the first node in the tree structure. In other embodiments, however, a variable time search algorithm may be used in order to increase the space efficiency of the texture atlas.

After rendering and combining the objects of a transparency group, the new image information may be combined with other image information, such as background information resulting from previously rendering other transparency groups. When combining a rendered transparency group with previously rendered transparency groups, the frame buffer may contain the previously rendered and blended images. In some embodiments, both the color channel and alpha channel from the frame buffer may be copied and saved in an independent buffer, such as in texture atlas 520.

Transparency group renderer 120 may use the Porter-Duff formula to obtain the "complete" alpha channel for images rendered prior to this new transparency group. The Porter-Duff formula defines how blending of pixels is done of the GPU, in which the shape and opacity values are combined and represented as a single alpha value. In some embodiments, a "complete" alpha channel may be obtained by recursively computing the union of the initial alpha with the previously rendered and blended alpha channel. For example, transparency group renderer 120 may be configured to turn off color writing so that only the alpha channel gets updated and then combine a previously saved version of the alpha channel with the alpha channel in the current buffer. The transparency group renderer 120 may then save off this new "complete" alpha into its own buffer, such as to a location in the texture atlas.

Transparency group renderer 120 may then set the current alpha channel to zero so that when the new transparency group is rendered, the alpha channel will only contain the alpha information for the new group and will not contain any alpha information from any previous renderings.

Transparency group renderer 120 may also zero out the color channel of the current buffer depending on whether the new transparency group is isolated or not. As described above, an isolated transparency group is not blended or combined with the other image information already rendered. Thus, if the new transparency group is an isolated transparency group, transparency group renderer 120 may zero out the color channel of the current buffer so that when rendering the new transparency group, no color information from the previously rendered images will be combined with the new color information being rendered. In one embodiment, transparency group renderer 120 may utilize a single shader language operation, such as the OpenGL command ::glClear. In other embodiments, transparency group renderer 120 may set the current color to zero, such as by use the OpenGL command, ::glColor(0,0,0,0), disable any blending mode, such as Porter-Duff blending. Transparency group renderer 120 may draw the bounds of the new transparency group to clear the contents of the current buffer wherever the new transparency group will be rendered. Transparency group renderer 120 may then enable any blending mode or may enable a different blending mode if required for rendering the new transparency group.

Transparency group renderer 120 may then blend the objects from the new transparency group into the current color and alpha buffers. For example, transparency group renderer 120 may setup the Porter-Duff formula by setting the blend function to use one minus the source alpha and using the adding function for the blend equation. After setting up the blending mode properly, transparency group renderer 120 may render or draw all the objects in the new transparency group. As described above, rendering the objects of the new transparency group may involve blending or combining various ones of the objects using different transparency levels.

Thus, after rendering all the objects of the new transparency group the current color buffer includes the color information for the new transparency group and the current alpha buffer includes the alpha information for the new transparency group.

If the newly rendered transparency group is non-isolated, meaning that the color information for the new group should be combined or blended with the color information from previously rendered images and transparency groups. However, the current buffer may only contain the color information from the newly rendered transparency group. So, transparency group renderer 120 may be configured to combine the color information from the current buffer (e.g. the color information for the newly rendered transparency group) with the previously saved color information from the previously rendered transparency groups. Transparency group renderer 120 may turn off alpha marking so that the current alpha buffer, which contains only the alpha information from the newly rendered transparency group, is not affected.

After combining the previously saved color information with the newly rendered color information if the newly rendered transparency group is non-isolated, transparency group renderer 120 may be configured to apply any alpha clipping that may be required to properly render the current image. Alpha clipping may involve a general object that contains only alpha information. Transparency group renderer 120 may set the blending function and equation and draw or render the alpha object or alpha clip. For example, transparency group renderer 120 may multiply both the color and alpha of the current frame buffer with the alpha channel of an alpha mask (e.g. an image with alpha values used for clipping).

Thus, the current color buffer includes the color information of the newly rendered transparency group possibly combined with the previously rendered color information. The alpha buffer, however includes only the alpha information of the newly rendered transparency group. If there is a non-normal blend mode (e.g. a blend mode other than using Porter-Duff) associated with the newly rendered transparency group, transparency group renderer may be configured to save the image information from the current buffer into a separate buffer, such as to a texture atlas and to then combine that with the previously saved image information of the previously rendered transparency groups and with the complete alpha saved previously. In some embodiments, transparency group renderer 120 may use a shader program to combine the two set of image information and the complete alpha information.

If, however, there is no non-normal blending mode associated with the newly rendered transparency group, transparency group renderer 120 may blend the current buffer, which currently has the color and alpha information for the newly rendered transparency group, with the previously saved color and alpha information of the previously rendered transparency groups using the Porter-Duff formula. For example, in one embodiment, transparency group renderer may use the following OpenGL commands to set up the Porter-Duff formula:

```
::glBlendFunc(GL_ONE, GL_ONE_MINUS_SRC_ALPHA);
::glBlendEquation(GL_FUNC_ADD);
```

Transparency group renderer 120 may then copy the previously saved color and alpha information for the previously rendered transparency groups.

Figure 8:
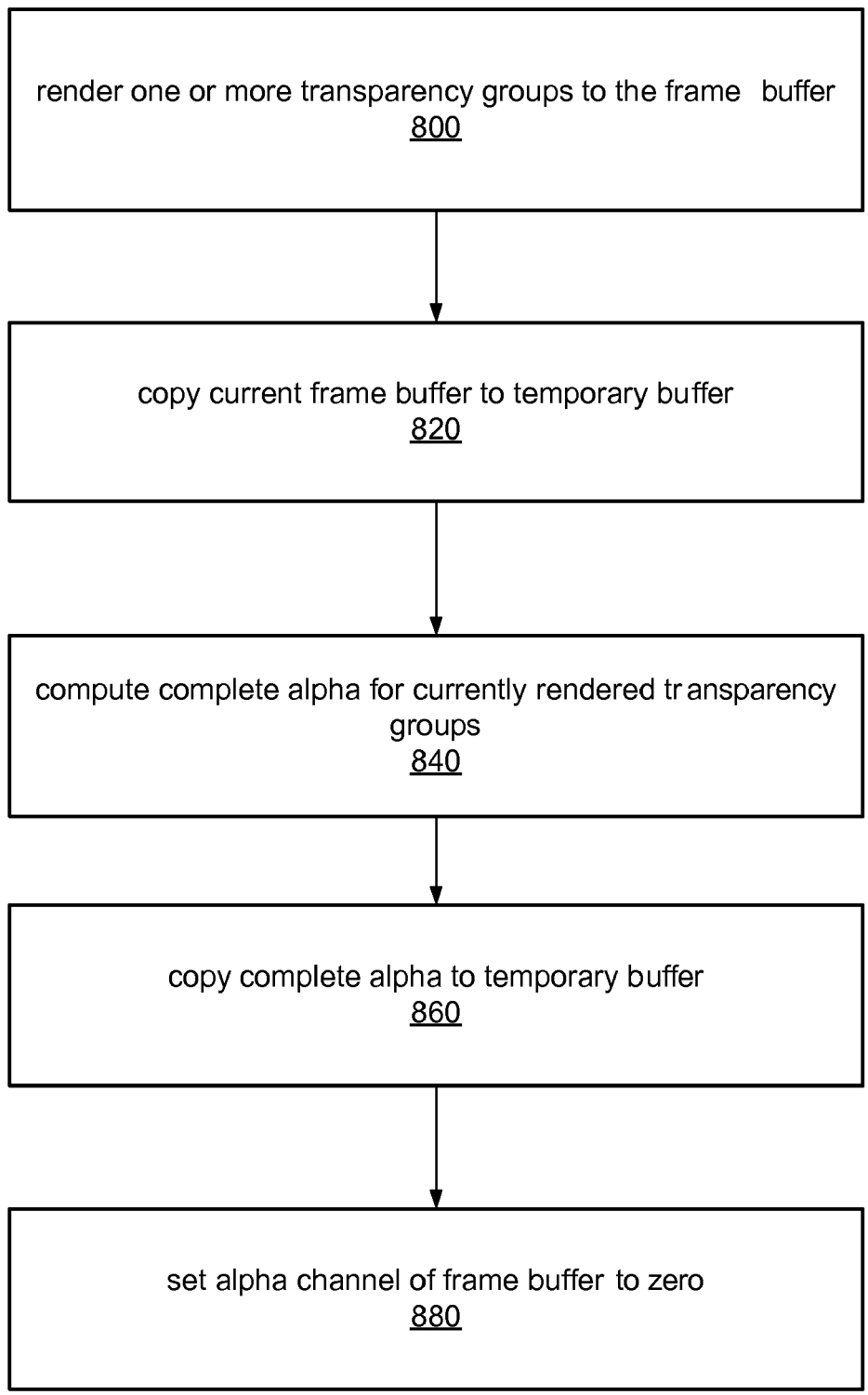
FIG. 8 is a flowchart illustrating one embodiment of a method for preparing to render a new transparency group to a frame buffer to which one or more transparency groups have previously been rendered.

FIG. 8 is a flowchart illustrating one embodiment of a method for preparing to render a new transparency group to a frame buffer to which one or more transparency groups have previously been rendered. After rendering one or more other transparency groups as indicated by block 800, the frame buffer includes the color and alpha contributes of the previously rendered groups. However, as described above, the alpha channel of the frame buffer may only include the alpha contribution of the most previously rendered transparency group. In order to be able to correctly combine the image information of the new transparency group with the current contents of the frame buffer, the new objects may be rendered to the frame buffer and then combined with the previous contents, as described above regarding rendering and combining the individual objects of a single transparency group. Thus, as illustrated by block 820, the contents of the current frame buffer, namely the color and alpha information for the previously rendered transparency groups, may be copied or saved to a temporary buffer, which may be used at a later time to combine with newly rendered image information. As described above, in one embodiment the frame buffer contents may be copied and stored in a texture atlas. In other embodiments, a new texture buffer may be allocated to store the contents of the frame buffer and in yet other embodiments, an additional frame buffer may be allocated to store the contents of the current frame buffer.

After saving the current contents of the frame buffer, a complete set of alpha information may be computed, according to some embodiments. As noted above, the alpha channel of the current frame buffer does not contain the combined alpha contributions of all previously rendered transparency groups. Instead, it contains only the alpha contribution of the most recently rendered group. However, a complete set of alpha information including the combined alpha contribution from all previously rendered transparency groups may be needed if the new transparency group to be rendered requires a non-normal blend mode (e.g. special effects). Moreover, in order to make a complete alpha available for a future rendering of yet another transparency group that might require a non-normal blend mode (e.g. special effects), some embodiments may always calculate and maintain a complete set of alpha information, as illustrated by block 840, even if the new transparency group to be rendered does not require a non-normal blend mode (e.g. special effects).

When computing a complete set of alpha information, the alpha information from the current frame buffer, which includes the alpha contributions of the most previously rendered transparency group, may be combined with an accumulated set of alpha information, which may be stored in another buffer or texture atlas, that includes the combined alpha information for all of the previously rendered transparency groups accept the most previously rendered transparency group. In one embodiment the complete set of alpha information may be calculated by enabling only alpha writing on the GPU, configuring the GPU to use Porter-Duff blending mode and then drawing or copying the previously alpha buffer containing the accumulated alpha information into the current frame buffer that contains the alpha information for the most recently rendered transparency group.

After computing the complete set of alpha information in the current frame buffer, transparency group renderer 120 may be configured to copy the complete alpha to a temporary buffer, as indicated by block 860. As described above, the complete alpha may be stored in a texture atlas, in a separate texture buffer, or in another frame buffer, according to various embodiments. After saving the complete alpha, transparency group renderer 120 may be configured to clear or set to zero the alpha channel of the current frame buffer, as illustrated by block 880. Thus, the alpha channel is ready to hold the alpha contribution of the new transparency group without having any alpha information from the previously rendered transparency groups.

Figure 9:
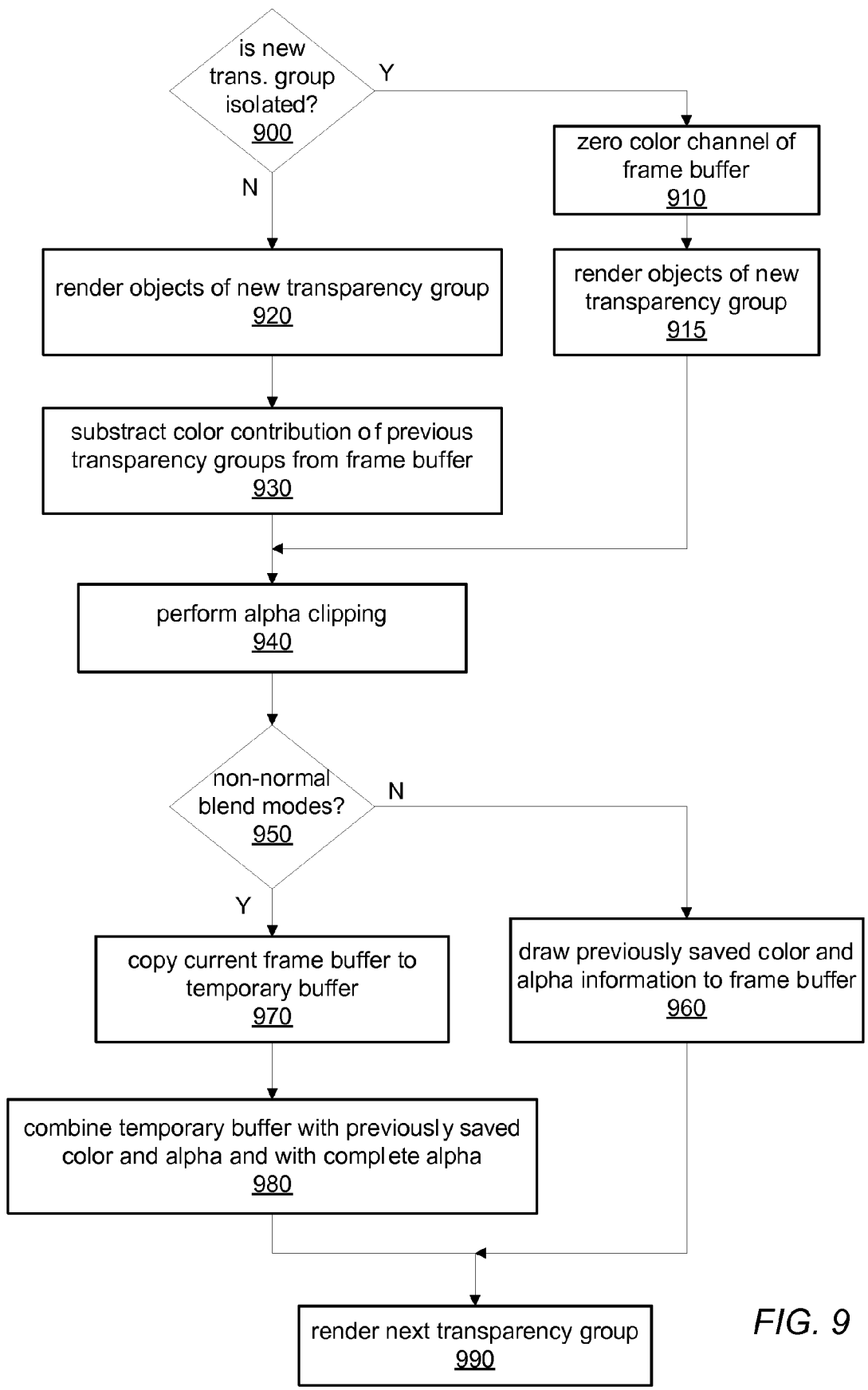
FIG. 9 is a flowchart illustrating one embodiment of a method for rendering a new transparency group to a frame buffer to which one or more transparency groups have previously been rendered.

The method described above regarding FIG. 8 represents functionality that transparency group renderer 120 may perform when preparing to render a new transparency group regardless of whether the new transparency group is an isolated or non-isolated group and regardless of whether the new transparency group requires any non-normal blending (e.g. special effects). FIG. 9 is a flowchart of one embodiment of a method for rendering a new transparency group after performing the method described above regarding FIG. 8.

After saving the current frame buffer, computing and saving a complete set of alpha, and setting the alpha channel of the frame buffer to zero, as described above regarding the method of FIG. 8, transparency group renderer 120 may be configured to also set the color channel of the frame buffer to zero, as illustrated by block 910, if the new transparency group to be rendered is an isolated transparency group, as indicated by the positive output of block 900. After clearing the color channel of the frame buffer if the new transparency group is an isolated group or without clearing the color channel if the new transparency group is not isolated, transparency group renderer 120 may render or draw the objects of the new transparency group, as illustrated by blocks 915 and 920. Rendering the individual objects of the new transparency group may be performed using the methods and functionality described above regarding FIGS. 5, 6, and 7. Thus, individual portions of the frame buffer and of various images from the objects may be copied to texture atlas 520 and then copied back out and combined with other images to render the new transparency group.

After rendering the objects of the new transparency group to the frame buffer, the frame buffer now contains the color and alpha information of the new transparency group. Additionally, if the new transparency group is a non-isolated group, and therefore transparency group renderer 120 did not clear the color channel of the frame buffer before rendering the objects in the new transparency group, the frame buffer may also include color contributions from transparency groups rendered before the new transparency group. Please note that the frame buffer needed to have the color contributions of the previously rendered transparency groups so that transparency group renderer 120 could properly render a non-isolated new transparency group. As described above, a non-isolated transparency group may involve blending that includes color information from the background, such as from other previously rendered images or transparency groups. If the new transparency group is non-isolated, transparency group renderer 120 may, after rendering the objects of the new transparency group, subtract out the color contributions of the previously rendered transparency groups, as indicated by block 930. However, transparency group renderer 120 may disable alpha marking on the GPU so subtracting out the previously rendered transparency groups does not remove any of the alpha information of the new transparency group. For a non-isolated transparency group, the color information was rendered on top (or into) the color information of the previously rendered transparency groups. However, the alpha channel was cleared to zero even for a non-isolated transparency group. Therefore, if alpha marking is enabled when subtracting out the color information for the previously rendered transparency groups, incorrect modifications may occur to the alpha information for the new transparency group. Thus, transparency group renderer 120 may disable alpha marking before subtracting out the color information of the previously rendered transparency groups, as indicated by block 930.

Additionally, transparency group renderer 120 may, in some embodiments, be configured to perform any alpha clipping required by the new transparency group, as illustrated by block 940. Alpha clipping is a technique in which the alpha channel (e.g. the alpha values) of one image (or of an otherwise empty image) is used to clip the contents of another image. Thus, in one embodiment, transparency group renderer 120 may multiply both the color and alpha of the current frame buffer with the alpha channel of an alpha mask (e.g. an image with alpha values used for clipping). In some embodiments, the alpha values of the alpha mask may be set to either 0 or 1. This clips the current image in the frame buffer because the multiplication will result in no color or alpha information at locations in the frame buffer for which the same location in the alpha mask was 0 and will result in the same color or alpha value for locations in the frame buffer for which the alpha mask was 1.

If the new transparency group as whole is associated with a normal blend mode (e.g. no special effects), as illustrated by the negative output of block 950, transparency group renderer 120 may be configured to combine the saved copy of the color and alpha information of the previously rendered transparency groups (e.g. the copy of the frame buffer saved at block 820 of FIG. 8), as indicated by block 960. If, however the new transparency group is associated with a non-normal blend mode (e.g. a special effect), transparency group renderer 120 may be configured to copy the current frame buffer (both color and alpha channels) to a temporary buffer, such as to texture atlas 520, as indicated by block 970, and to combine that copy from the temporary buffer with both the complete alpha and the image information (both color and alpha channels) of the previously rendered transparency groups, as indicated by block 980.

When combining the image information for the new transparency group that requires a non-normal blend mode (e.g. special effects) with the image information for the previously rendered transparency groups and with the complete alpha, transparency group renderer 120 may be configured to utilize a custom shader program configured to implement whatever non-normal blend mode or special effect is required. Thus, while transparency group renderer 120 may be configured to configure the various buffers and texture atlas entries to contain the appropriate versions of the various image and alpha information, the shader program may perform the actual combining according to the required (non-normal) blend mode or special effect.

Thus, transparency group renderer 120 may then begin rendering the next transparency group, as indicated by block 990.

Transparency group renderer 120 may utilize various mathematical formulae as part of rendering, blending and combining transparency group image information. For example, the following formulae relate to blending operations:

1. Unmultiplied Color blending formula:

$$\alpha_r = (1-\alpha_s)\alpha_d + \alpha_s = \alpha_d + \alpha_s - \alpha_d\alpha_s$$

$$\alpha_r c_r = (1-\alpha_s)\alpha_d c_d + (1-\alpha_d)\alpha_s c_s + \alpha_s \alpha_d B(c_s, c_d)$$

2. Pre-Multiplied Color Blending Formula:

$$c'_r = \alpha_r c_r$$

$$c'_r = (1-\alpha_s)c'_d + (1-\alpha_d)c'_s + \alpha_s\alpha_d B\left(\frac{c'_s}{\alpha_s}, \frac{c'_d}{\alpha_d}\right)$$

3. Special Case: Normal Blend Mode:

$$B_N(c_s, c_d) = c_s$$

$$c_r' = (1-\alpha_s)c_d' + c_s'$$

When using the pre-multiplied formula for normal blend modes, transparency group renderer 120 may use the GPU blending (Porter-Duff). For example, the following example code uses OpenGL commands to set up GPU blending:

```
::glBlendFunc(GL_ONE, GL_ONE_MINUS_SRC_ALPHA);
::glBlendEquation(GL_FUNC_ADD);
```

When the GPU blending mode is configured this way, pre-multiplied objects may be sent to the GPU and the GPU will blend the incoming object in the color buffer using formula number 3 above. As described herein, this GPU blending configuration and formula number 3 may be used for the entire handling of transparency groups on the GPU, according to some embodiments.

The blending alpha information may be represented by the union of the source and destination alpha values, as indicated by the following formula:

$$\alpha_s \cup \alpha_d = \alpha_s + \alpha_d - \alpha_s\alpha_d = (1-\alpha_s)\alpha_d + \alpha_s \qquad 4)$$

To put it another way, blending of the alpha information represents the added surface of 2 rectangles into a 1×1 rectangle (e.g. a pixel). Please note that the formula described above regarding alpha blending is both commutative and associative. Additionally, formula 4 above is equivalent to formula 3 above. Thus, the same formula (e.g. the Porter-Duff based blending on a GPU) may be used both for color and alpha blending.

As noted above, blending on the GPU is controlled by Porter-Duff algebra. In particular formula 3 above may be achieved by using the OpenGL value of GL_ONE for the source factor and the OpenGL value GL_ONE_MINUS_

SRC_ALPHA for the destination factor and GL_FUNC_ADD for the operation:

$$(1-\alpha_s)c_d' + c_s'$$

A transparency group with $m_n$ objects may be defined as: $G_n$. The pre-multiplied color of the incoming objects that are going to be blended may be defined as: $c_n^{0\dagger} \ldots c_n^{m_n\dagger}$ and the alpha of the incoming objects may be defined as $\alpha_n^0 \ldots \alpha_n^{m_n}$. For example, $$O_n^{i'} = \{c_n^{i'}, \alpha_n^i\},$$

where $1 \leq i \leq m_n$, represents both the color and alpha for a set $m_n$ objects.

One object $O_n^{i\dagger}$ may represent the pre-multiplied result of another transparency group, or simply an arbitrary pre-multiplied color and alpha. The groups may be nested such as: $G_n \subset G_{n-1} \subset \ldots \subset G_0$. In particular, if j represents an index such that $O_{n-1}^{j\dagger} = G_n$, the result of rasterizing $O_{n-1}^{j\dagger} = G_n$ will need to be blended inside $G_{n-1}$.

If $P_n^0$ denotes the initial color state of $G_n$ and $P_n^i$ $1 \leq i \leq m_n$ denotes the color state of $G_n$ after blending the first objects on $O_n^{1\dagger} \ldots O_n^{i\dagger}$, for a non-isolated transparency group, $P_n^0 = P_{n-1}^{j-1}$ and for an isolated transparency group, $P_n^0 = 0$.

If the blend mode is normal for all the objects, the recursive formula for $P_n^i$ is: $P_n^i = (1-\alpha_n^{i\dagger})P_n^{i-1} + c_n^{i\dagger}$ For $1 \leq i \leq m_n$. As for the alpha value, define $A_n^i$ the alpha value inside $G_n$ after $O_n^{1\dagger} \ldots O_n^{i\dagger}$ get blended inside the group:

$$A_n^i = A_n^{i-1} \cup \alpha_n^i \text{ For } 1 \leq i \leq m_n.$$

$$A_n^0 = 0$$

Thus, the Porter-Duff formula may be used to blend the incoming objects $O_n^{1\dagger} \ldots O_n^{m_n\dagger}$ inside the transparency group $G_n$.

After all of the objects of $G_n$ are blended, the state of the color and alpha buffer of the GPU may be $\{P_n^{m_n}, A_n^{m_n}\}$. In order to blend $G_n$ inside of $G_{n-1}$, the color and alpha buffer may need to reflect only $G_n = O_{n-1}^{j\dagger}$. Thus, in order to obtain $G_n$ only, the following formulas may need to be computed:

$P_n^{m_n} - P_n^0(1 - A_n^{m_n})$ For the color of any transparency group $G_n$.

Or $P_n^{m_n} - P_{n-1}^{j-1}(1 - A_n^{m_n})$ if $G_n$ is non-isolated. [Formula 5]

Or $P_n^{m_n}$ is $G_n$ is isolated.

And $A_n^{m_n}$ for the alpha.

Please note that the alpha channel already represents $G_n$ alone after $G_n$ has been rasterized. Additionally, if the transparency group $G_n$ is isolated, the color channel already represented $G_n$ alone. However, this is not the case when $G_n$ is not isolated. When $G_n$ is non-isolated, formula 5 above may be used to obtain the color information for $G_n$.

Thus, the Porter-Duff formula may be used exclusively to obtain in the GPU buffer the color and alpha information for $G_n$. Additionally, non-normal blend modes may also be supported using only the "native" blending capabilities of the GPU, thus preventing the need to have a manually written program shader program to perform the blending and more importantly, the buffer does not have to be "read back" to perform the blending.

When rendering a new transparency group, $G_n = O_{n-1}^{j\dagger}$ into a frame buffer to which other transparency groups have already been rendered, the current buffer on the GPU may contain $P_{n-1}^{j-1}$ and $A_{n-1}^{j-1}$, the color and alpha information for the previously rendered transparency groups. Thus, transparency groups $G_n$ through $G_{n-1}$ have already been rendered.

First copy both the color and alpha information, $P_n^0 = P_{n-1}^{j-1}$ and $A_{n-1}^{j-1}$, from the current buffer to their own independent buffer(s). For example, as described above, the color and alpha information may be copied to a texture buffer or to a texture atlas.

Additionally, the Porter-Duff formula may be used to obtain a "complete" version of the alpha channel for the entire set of previously rendered objects. As noted above, the current state of the alpha channel on the GPU contains the alpha information for only the most recently rendered transparency group. By recursively computing the union of the current alpha information $A_{n-1}^{j-1}$ with the previously saved alpha buffer of $G_{n-1}$, the "complete" alpha may be obtained. In some embodiments, this complete alpha information is required to support non-normal blending modes (e.g. special effects). Also turn off color writing by using the ::glColorMask command so that only the alpha information is written. For example, the following OpenGl commands may be used to setup the Porter-Duff formula.

```
::glBlendFunc(GL_ONE, GL_ONE_MINUS_SRC_ALPHA);
::glBlendEquation(GL_FUNC_ADD);
::glColorMask(0,0,0,1) // alpha channel only
<draw the initial alpha buffer of G_{n-1}>
::glColorMask(1,1,1,1) // restore full updating of color and alpha
```

The newly computed "complete" alpha may then be copied into its own Independent buffer. For example, in one embodiment, the complete alpha information may be stored to a texture atlas. Alternatively, in other embodiments, the alpha information may be copied to another buffer or even to another frame buffer.

In some embodiments, the alpha buffer of the GPU may be zeroed or cleared in order to only have the alpha contributions from the new transparency group being collected. Additionally, in some embodiments, if the new transparency group $G_n$ is isolated, the color channel inside the color buffer is also cleared. For example, by first using the OpenGL ::glColor command using all zeros as parameters (e.g., ::glColor(0,0,0,0)) then disabling Porter-Duff blending and then drawing the bounds of the new transparency group (e.g. drawing an area that encompasses any portion of the buffer that may be affected by rendering the new transparency group), the color buffer may be cleared or zeroed and ready for rendering the new transparency group.

The actual objects of the new transparency group $G_n$: $O_n^{1\dagger} \ldots O_n^{m_n\dagger}$ may now be rendered and blended inside the color and alpha buffer. For example, the Porter-Duff formula may be setup using OpenGL with the following two commands:

```
::glBlendFunc(GL_ONE, GL_ONE_MINUS_SRC_ALPHA);
::glBlendEquation(GL_FUNC_ADD);
```

After setting up Porter-Duff blending, the objects $O_n^{i\dagger}$, $1 \leq i \leq m_n$ of $G_n$ are drawn to the color and alpha buffers. Thus, the color buffer now includes $P_n^{m_n}$, the color information for the objects $G_n : O_n^{1\dagger} \ldots O_n^{m_n\dagger}$, and the alpha buffer includes $A_n^{m_n}$, the alpha information for the same objects.

If the new transparency group is non-isolated, the buffer needs to contain $O_{n-1}^{j\dagger} = G_n = P_n^{m_n} - P_{n-1}^{j-1}(1 - A_n^{m_n})$ In other words, the color contribution from the previously rendered images that were left in the buffer previously needs to be removed. As noted above, the color buffer was cleared only if the new transparency group was isolated. Here, if the group is not isolated, after drawing all the objects of the new transparency group, the color contributions of the previously rendered transparency groups need to be removed so that any additional operations for the transparency group, such as alpha clipping may be performed only on the image information of the current transparency group. Subsequently, as will be discussed later, the color contributions of the previous transparency groups may again be blended with the current transparency group.

Alpha clipping involves removing portions of the color image based on values in the alpha information. For example, the alpha information for an image may represent opacity (or transparency) values for the image. Thus, using such alpha information as a clipping mask may completely remove any color information for portions of the image that are completely transparent. In general, however, an alpha channel mask may be used to perform any general clipping by first setting the alpha values correctly to represent those portions of the image that should be clipped. To perform the alpha clipping, both the color and alpha information from the currently drawn transparency group, $G_n$, may be multiplied with the alpha channel mask. In other words, since, an alpha mask includes opacity values, where 0 represents complete transparency, multiplying the current color and alpha information for the transparency group with the alpha mask will remove those sections outside the mask (e.g. because anywhere the alpha mask is zero the result of the multiplication will also be zero). To setup the GPU to perform the alpha clipping the GPU blend function may be set up with a source factor of zero and a destination factor equal to the alpha values of the alpha mask. The blend equation may be set to add the source and destination values. Thus, the following OpenGL code represents one embodiment of setting up the blending formula for performing the alpha clipping.

```
::glBlendFunc(GL_ZERO, GL_SRC_ALPHA);
::glBlendEquation(GL_FUNC_ADD);
```

After setting up the blend mode, as described above, the alpha clip mask is then drawn to the current color and alpha buffer, thus performing an alpha clipping of the current image based on the alpha mask.

Now, any non-normal blend modes (e.g. special effects) designated for blending the new transparency group with the background (e.g. $P_{n-1}^{j-1}$ and $A_{n-1}^{j-1}$) may be applied. The color and alpha buffer may represent the current transparency group, $G_n$, and any optional alpha clipping that was performed, as noted above. Non-normal blend modes may be computed by first saving a copy of the current color and alpha buffer. In other words, the color and alpha information for the transparency group, $G_n$, may be copied into a separate buffer, such as to a texture atlas. Then a shader program configured to perform the non-normal blend mode or special effect may then be execute that will combine the just saved copy of the $G_n$ color and alpha information with the original background color information saved previously and the "complete" alpha computed and saved previously. Thus, the output of the custom shader program may be color and alpha information representing the blending (and special effects) of $G_n$ in $G_{n-1}$ (aka $P_{n-1}^j$ and $A_{n-1}^j$). In other words, the shader program may combine the new rendered transparency group image (and alpha information) with the image information from any rendering and blending that occurred prior to starting to render the current transparency group while taking into account the "complete" alpha (rather than the alpha that was in the alpha buffer when the rendering of the transparency group was started).

Alternatively, if there is not any non-normal blend mode associated with the current transparency group (e.g. no special effects), the current buffer, which currently contains the color and alpha contributions of only the current transparency group, may be combined with the original background color and alpha information saved originally. Thus resulting in the final color and alpha information representing the new transparency group blended into the previous background color and alpha information. In one embodiment, the following OpenGL command may be used to setup the Porter-Duff blending formula that may be used to blend the current transparency group with the original background image:

```
::glBlendFunc(GL_ONE, GL_ONE_MINUS_SRC_ALPHA);
::glBlendEquation(GL_FUNC_ADD);
```

After setting up the Porter-Duff blending formula, the previously saved color and alpha information representing the color and alpha contributions of the transparency groups rendered before the current transparency group is drawn or otherwise combined with the current transparency group in the current color and alpha buffers.

Thus, the new transparency group was rendered and blended with other, previously rendered transparency groups, even through the transparency groups included pre-multiplied color and alpha information by using the Porter-Duff algebra available on the GPU. Additionally, the number of copies of the back buffer (the image information for the previously rendered transparency groups) may be minimized, according to some embodiments.

Additionally, please note that the alpha channel of the current buffer includes only the alpha information for the current transparency group, not the final alpha, which is included in the color information since pre-multiplied colors may be used.

As described above, the new transparency group may be rendered and blended with the background using only two or three copies of the frame buffer (e.g. saved to a texture atlas), in some embodiments. For example, if the new transparency group includes non-normal blend modes (e.g. special effects) and is non-isolated, only three copies of the buffer may be required. Similarly, in some embodiments, only two copies of the buffer may be required if the transparency includes only normal blend modes (e.g. no special effects). Additionally, if the transparency group is isolated, one fewer copies of the buffer may be required. In other words when rendering an isolated transparency group, only 2 copies of the buffer may be required when using non-normal blend modes (special effects) and only a single copy of the buffer may be required when only normal blend modes (no special effects) are used, according to some embodiments.

Although, please note that the numbers of buffers described above refer only to the buffers required to blend the complete rasterized transparency group with the background and do not include any buffers that may be needed to render, blend and/or combine the individual objects and images of the transparency group. As described previously, additional buffers, such as in a texture atlas may be (temporarily) used when rendering, blending and/or combining the individual constituent images that make up a transparency group. Additionally, the above numbers do not include maintaining an additional buffer for the "complete" or "accumulated" alpha, since only the alpha information for the current transparency group is kept in the main buffer.

In some embodiments, transparency group renderer 120 may be configured to implement an alpha server. An alpha server may be considered a paint server that draws or marks the alpha channel instead of the color channel. A "paint server" may determine how color is applied, such as when using various drawing techniques like "paintbrush". A paint server may allow for fill and stroke methods beyond merely fill an area with color. For example, a default paint server may fill or apply color with only a solid color. In contrast, a pattern paint server may apply particular pattern using multiple colors. Similarly, an alpha server may determine how alpha values are applied to an object or a transparency group. In some embodiments, an alpha server may be implemented as a transparency group by rasterizing an alpha server as an isolated transparency group, converting to gray, using the gray in all color and alpha channels, and using GL_ZERO and GL_SRC_ALPHA (when using OpenGL) to multiply by the incoming alpha after the backdrop is removed. Thus, an alpha server may be implemented without requiring a custom GPU shader program.

Additionally, in some embodiments, a snapshot of the progress during the rasterization of the transparency group may be displayed. For example, since the rasterization of the current transparency group is started as an isolated group and since the alpha channel includes only the alpha information for the current group, a GPU shader program that calculates the union of the current alpha buffer with the previously saved accumulated alpha. Thus, a snapshot of a current state of in-progress rasterization may be obtained.

Rendering transparency groups on a GPU using a single frame buffer, as described herein may be implemented on various types of computer systems. Referring again to FIG. 1, computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, or in general any type of computing device.

The transparency group renderer 120 described herein may be provided as a computer program product, or software, that may include a computer-readable storage medium having stored thereon instructions, which may be used to program a computer system (or other electronic devices) to implement a transparency group renderer as described herein. A computer-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

A computer system 1000 may include a processor unit (CPU) 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, LEPROM, or other memory type), an interconnect 1020 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. Embodiments of the transparency group renderer described herein may include fewer or additional components not illustrated in FIG. 1 (e.g., video cards, audio cards, storage devices, additional network interfaces, peripheral devices, or other components). The CPU 1030, the network interface 1050, and the memory 1010 may be coupled to the interconnect 1020. It should also be noted that one or more components of system 1000 might be located remotely and accessed via a network. One or more of the memories 1010 may embody a transparency group renderer 120.

In some embodiments, memory 1010 may include program instructions configured to implement a transparency group render 120, as described herein. Transparency group render 120 may be implemented in any of various programming languages or methods. For example, in one embodiment, transparency group render 120 may be JAVA based, while in another embodiments, it may be implemented using the C or C++ programming languages. In other embodiments, transparency group renderer 120 may be implemented using specific graphic languages specifically for developing programs executed by specialize graphics hardware, such as GPU 1040. In addition, transparency group renderer 120 may be embodied on memory specifically allocated for use by graphics processor(s) 1040, such as memory on a graphics board including graphics processor(s) 1040. Thus, memory 1010 may represent dedicated graphics memory as well as general purpose system RAM. Alternately, memory 1010 may represent video memory that includes a frame buffer 130.

Network interface 1040 may be configured to enable computer system 1000 to communicate with other computers, systems or machines, such as across network 100, described above. Network 100 may enable data communication between computer system 1000 and among other entities illustrates in FIGS. 1A and 1B, described above. Network interface 1040 may use standard communications technologies and/or protocols. Network 100 may include, and network interface 1040 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

While the transparency group render has been described with reference to various embodiments, it will be understood that these embodiments are illustrative and that the scope of the document-based data collection system is not limited to them. Many variations, modifications, additions, and improvements are possible. More generally, the present transparency group render is described in the context of particular embodiments. For example, the blocks and logic units identified in the description are for ease of understanding and not meant to limit the transparency group render to any particular embodiment. Functionality may be separated or combined in blocks differently in various realizations or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
   one or more graphics processors; and
   memory coupled to the one or more graphics processors, comprising:
     a frame buffer configured to store both color and alpha information, wherein the alpha information indicates a level of opacity for the color information; and
     wherein the memory stores program instructions executable by the one or more graphics processors to:
       render one or more previous transparency groups to the frame buffer, wherein a transparency group is a composition of a plurality of graphics objects, wherein each of the plurality of graphics objects has an individual transparency level, and wherein the plurality of graphics objects are composited to form the transparency group dependent on the individual transparency level of each of the plurality of graphics objects, and wherein a transparency group is rendered as a single object according to a level of transparency associated with the transparency group, and wherein each of the one or more previous transparency groups comprise color information pre-multiplied with alpha information;
       store a copy of the frame buffer including image information for the one or more previous transparency groups to a separate buffer;
       render a new transparency group to the frame buffer using a Porter-Duff blending formula, wherein the new transparency group comprises color information pre-multiplied with alpha information; and
       combine the copy of the frame buffer from the separate buffer with the rendered new transparency group using the Porter-Duff blending formula.

2. The system of claim 1, wherein the program instructions are further executable to clear the color information in the frame buffer prior to said rendering the new transparency group if the new transparency group is an isolated transparency group.

3. The system of claim 1, wherein the program instructions are further executable to subtract the color contribution of the one or more previous transparency groups from the frame buffer after said rendering the new transparency group if the new transparency group is a non-isolated transparency group.

4. The system of claim 1, wherein the program instructions are further configured to clear the alpha information of the frame buffer prior to said rendering the new transparency group to the frame buffer.

5. The system of claim 1, wherein the program instructions are further executable to compute a complete set of alpha information for the one or more previous transparency groups, wherein to compute the complete set of alpha information, the program instructions are executable to:
   disable color marking on at least one of the one or more graphics processors; and
   combine the alpha information of the frame buffer with previously saved alpha information for all but a most recently rendered one of the previous transparency groups.

6. The system of claim 5, wherein the program instructions are further executable to clear the alpha information of the frame buffer prior to said rendering the new transparency group to the frame buffer, wherein the program instructions are executable to compute said complete set of alpha information for the one or more previous transparency groups prior to said clearing the alpha information of the frame buffer.

7. The system of claim 5, wherein the program instructions are further executable to copy the complete set of alpha information to a separate buffer.

8. The system of claim 1, wherein the program instructions are further executable to clip the color information and the alpha information of the frame buffer according to alpha information in an alpha mask image.

9. The system of claim 1, wherein the program instructions are further executable to copy the frame buffer to another separate buffer after said combining the copy of the frame buffer from the separate buffer with the rendered new transparency group if the new transparency group is associated with special effects for combining the new transparency group with the one or more previous transparency groups.

10. The system of claim 1, wherein in said combining the copy of the frame buffer from the separate buffer with the rendered new transparency group, the program instructions are further executable to combine the copy of the frame buffer copied to the another separate buffer with said copy of the frame buffer including image information for the one or more previous transparency groups and with a complete set of alpha information for the one or more previous transparency groups.

11. The system of claim 1, further comprising a texture buffer configured as a texture atlas, wherein said storing a copy of the frame buffer to a separate buffer comprises storing the copy of the frame buffer to the texture atlas.

12. A method, comprising:
   rendering, on a graphics processing unit (GPU), one or more previous transparency groups to a frame buffer, wherein a transparency group is a composition of a plurality of graphics objects, wherein each of the plurality of graphics objects has an individual transparency level, and wherein the plurality of graphics objects are composited to form the transparency group dependent on the individual transparency level of each of the plurality of graphics objects, and wherein a transparency group is rendered as a single object according to a level of transparency associated with the transparency group, and wherein each of the one or more previous transparency groups comprise color information pre-multiplied with alpha information, and wherein the frame buffer is configured to store both color and alpha information;

storing a copy of the frame buffer including image information for the one or more previous transparency groups to a separate buffer;

rendering a new transparency group to the frame buffer using a Porter-Duff blending formula, wherein the new transparency group comprises color information pre-multiplied with alpha information; and combining the copy of the frame buffer from the separate buffer with the rendered new transparency group using the Porter-Duff blending formula.

13. The method of claim 12, further comprising clearing the color information in the frame buffer prior to said rendering the new transparency group if the new transparency group is an isolated transparency group.

14. The method of claim 12, further comprising subtracting the color contribution of the one or more previous transparency groups from the frame buffer after said rendering the new transparency group if the new transparency group is a non-isolated transparency group.

15. The method of claim 12, further comprising clearing the alpha information of the frame buffer prior to said rendering the new transparency group to the frame buffer.

16. The method of claim 12, further comprising computing a complete set of alpha information for the one or more previous transparency groups, wherein said computing the complete set of alpha information, comprises:
    disabling color marking on the GPU; and
    combining the alpha information of the frame buffer with previously saved alpha information for all but a most recently rendered one of the previous transparency groups.

17. The method of claim 16, further comprising clearing the alpha information of the frame buffer prior to said rendering the new transparency group to the frame buffer, wherein said computing the complete set of alpha information for the one or more previous transparency groups is performed prior to said clearing the alpha information of the frame buffer.

18. The method of claim 16, further comprising copying the complete set of alpha information to a separate alpha buffer.

19. The method of claim 12, further comprising clipping the color information and the alpha information of the frame buffer according to alpha information in an alpha mask image.

20. The method of claim 12, further comprising copying the frame buffer to another separate buffer after said combining the copy of the frame buffer from the separate buffer with the rendered new transparency group if the new transparency group is associated with special effects for combining the new transparency group with the one or more previous transparency groups.

21. The method of claim 12, wherein said combining the copy of the frame buffer from the separate buffer with the rendered new transparency group comprises combining the copy of the frame buffer copied to the another separate buffer with said copy of the frame buffer including image information for the one or more previous transparency groups and with a complete set of alpha information for the one or more previous transparency groups.

22. The method of claim 12, wherein said storing the copy of the frame buffer to the separate buffer comprises storing the copy of the frame buffer to a texture atlas.

23. A machine-readable storage medium storing program instructions executable to implement:
    rendering, on a graphics processing unit (GPU), one or more previous transparency groups to a frame buffer, wherein a transparency group is a composition of a plurality of graphics objects, wherein each of the plurality of graphics objects has an individual transparency level, and wherein the plurality of graphics objects are composited to form the transparency group dependent on the individual transparency level of each of the plurality of graphics objects, and wherein a transparency group is rendered as a single object according to a level of transparency associated with the transparency group, and wherein each of the one or more previous transparency groups comprise color information pre-multiplied with alpha information, and wherein the frame buffer is configured to store both color and alpha information;
    storing a copy of the frame buffer including image information for the one or more previous transparency groups to a separate buffer;
    rendering a new transparency group to the frame buffer using a Porter-Duff blending formula, wherein the new transparency group comprises color information pre-multiplied with alpha information; and
    combining the copy of the frame buffer from the separate buffer with the rendered new transparency group using the Porter-Duff blending formula.

* * * * *